US012017152B2

(12) United States Patent
Anderson et al.

(10) Patent No.: US 12,017,152 B2
(45) Date of Patent: Jun. 25, 2024

(54) ATMOSPHERIC EFFECTS SYSTEMS FOR PRESENTING ATMOSPHERIC EFFECTS RELATING TO AN EVENT

(71) Applicant: Sphere Entertainment Group, LLC., New York, NY (US)

(72) Inventors: Robert Anderson, Levittown, NY (US); Stuart Elby, Westport, CT (US); Erik Hockman, New York, NY (US); Michael Allen Rives, Orlando, FL (US); Jeffery Lynn Wertz, Clemont, FL (US); Darik Wade Beaver, Clemont, FL (US); Jason David Adams, Winter Garden, FL (US); Joshua Richard Anderson, Orlando, FL (US); Brian Andrew Maier, Orlando, FL (US); Richard Neal Fleming, Apollo Beach, FL (US); Tony Leonard Oxford, Orlando, FL (US)

(73) Assignee: CSC Holdings, LLC, Bethpage, NY (US)

( * ) Notice: Subject to any disclaimer, the term of this patent is extended or adjusted under 35 U.S.C. 154(b) by 69 days.

(21) Appl. No.: 17/682,969

(22) Filed: Feb. 28, 2022

(65) Prior Publication Data

US 2022/0176265 A1 Jun. 9, 2022

Related U.S. Application Data

(63) Continuation of application No. 16/997,518, filed on Aug. 19, 2020, now Pat. No. 11,266,921.

(51) Int. Cl.

*A63J 5/02* (2006.01)
*B05B 1/20* (2006.01)
(Continued)

(52) U.S. Cl.

CPC .................. *A63J 5/02* (2013.01); *B05B 1/20* (2013.01); *F15D 1/08* (2013.01); *A63J 2005/008* (2013.01)

(58) Field of Classification Search

CPC .... B32B 3/266; G05B 19/042; F24F 2221/08; F24F 2221/12; F24F 2221/50; A63J 5/02
(Continued)

(56) References Cited

U.S. PATENT DOCUMENTS 4,023,645 A 5/1977 Retka et al.
4,199,936 A 4/1980 Cowan et al.
(Continued)

FOREIGN PATENT DOCUMENTS

WO WO 2019/121744 A1 6/2019

OTHER PUBLICATIONS

Notification of Transmittal of the International Search Report and the Written Opinion of the International Searching Authority, for PCT Appl. No. PCT/US2021/046479, 8 pages, dated Sep. 21, 2021.
(Continued)

*Primary Examiner* — Kien T Nguyen
(74) *Attorney, Agent, or Firm* — Sterne, Kessler, Goldstein & Fox. P.L.L.C.

(57) ABSTRACT

An air amplifier utilizes a high-pressure input stream of air to accelerate a low-velocity input stream of air to provide a high-velocity, high-volume output stream of air. A coupled air amplifier array includes multiple air amplifiers which couple their respective output streams of air to one another to form a single collective output stream of air. Multiple coupled air amplifier arrays can be utilized to form coupled air amplifier array systems to provide multiple collective output streams of air which can be focused toward to an audience within a venue. The coupled air amplifier array system can be implemented within atmospheric effects sys-
(Continued)

tems to provide atmospheric effects, such as wind, scent, and/or temperature to provide some examples, relating to an event. These atmospheric effects systems can present these atmospheric effects to the audience to enhance the immersion of the audience as they are viewing the event. These atmospheric effects systems can include multiple portable mobile effects pods that are situated within different locations within the venue to present these atmospheric effects to different locations with the venue.

21 Claims, 17 Drawing Sheets

(51) Int. Cl.
*F15D 1/08* (2006.01)
*A63J 5/00* (2006.01)

(58) Field of Classification Search
USPC ................................................ 472/92, 94, 64
See application file for complete search history.

(56) References Cited

U.S. PATENT DOCUMENTS

| | | | | |
|---|---|---|---|---|
| 4,370,155 | A * | 1/1983 | Armbruster | F24F 7/065 55/482 |
| 7,691,002 | B2 | 4/2010 | Casey et al. | |
| 8,336,261 | B2 | 12/2012 | Hosking et al. | |
| 9,307,841 | B2 | 4/2016 | Jamele et al. | |
| 11,260,314 | B1 | 3/2022 | Anderson et al. | |
| 11,266,921 | B1 | 3/2022 | Anderson et al. | |
| 2005/0284692 | A1 | 12/2005 | McWilliam et al. | |
| 2007/0119433 | A1 | 5/2007 | Popik et al. | |
| 2009/0014237 | A1 | 1/2009 | Skowronski et al. | |
| 2012/0131858 | A1 | 5/2012 | Hosking et al. | |
| 2015/0198150 | A1 | 7/2015 | Streeter | |
| 2015/0345497 | A1 | 12/2015 | Lucas et al. | |
| 2017/0074288 | A1 | 3/2017 | Venugopal Setty et al. | |
| 2017/0131858 | A1 | 5/2017 | Gu | |
| 2017/0191684 | A1* | 7/2017 | Tompkins | A47C 21/044 |
| 2017/0306845 | A1 | 10/2017 | Laing et al. | |
| 2020/0224810 | A1 | 7/2020 | Hakuta et al. | |
| 2021/0093742 | A1* | 4/2021 | Miki | A45D 34/02 |
| 2021/0293210 | A1 | 9/2021 | Timme | |
| 2022/0054952 | A1 | 2/2022 | Anderson et al. | |
| 2022/0054953 | A1 | 2/2022 | Anderson et al. | |

OTHER PUBLICATIONS

International Search Report and Written Opinion of the International Searching authority directed to related International Application No. PCT/US22/12543, dated Apr. 4, 2022; 14 pages.

U.S. Appl. No. 17/150,794, entitled "Air Amplifier With Noise Suppression," filed Jan. 15, 2021.

* cited by examiner

ATMOSPHERIC EFFECTS SYSTEMS FOR PRESENTING ATMOSPHERIC EFFECTS RELATING TO AN EVENT

CROSS REFERENCE TO RELATED APPLICATION

This application is a continuation of U.S. patent application Ser. No. 16/997,518, titled "Atmospheric Effects System For Presenting Atmospheric Effects Relating To An Event," filed Aug. 19, 2020, now U.S. Pat. No. 11,266,291, which is hereby incorporated by reference here in its entirety.

BACKGROUND

The United States Media and Entertainment Industry is the largest in the world. The United States Media and Entertainment Industry represents a third of the global media and entertainment industry which delivers events, such as musical events, theatrical events, sporting events, and/or motion picture events, to an audience for their viewing pleasure. Presently, venues, such as music venues and/or sporting venues to provide an example, deliver these events to the audience using audio-visual systems having various display screens surrounded by auditory speakers. Operators of these venues have made many attempts to further enhance the immersion of the audience as they are viewing these events. For example, these operators have used large flames to deliver conventional heating effects to the audience, but these large flames cannot be used within indoor venues and impose fire concerns. Other conventional heating systems, such as large radiant space heaters, have also been used to deliver the conventional heat effects, but these conventional heating systems are extremely inefficient, require an almost limitless amount of power, and also imposed fire concerns. Operators of these venues have used large air blowers, such as large industrial fans to provide an example, to deliver conventional cooling effects to the audience, but these large air blowers have difficulty in providing a large enough air volume to deliver these conventional cooling effects to the entire audience.

BRIEF DESCRIPTION OF THE DRAWINGS

Aspects of the present disclosure are best understood from the following detailed description when read with the accompanying figures. It is noted that, in accordance with the standard practice in the industry, features are not drawn to scale. In fact, the dimensions of the features may be arbitrarily increased or reduced for clarity of discussion.

DETAILED DESCRIPTION

Figure 1:
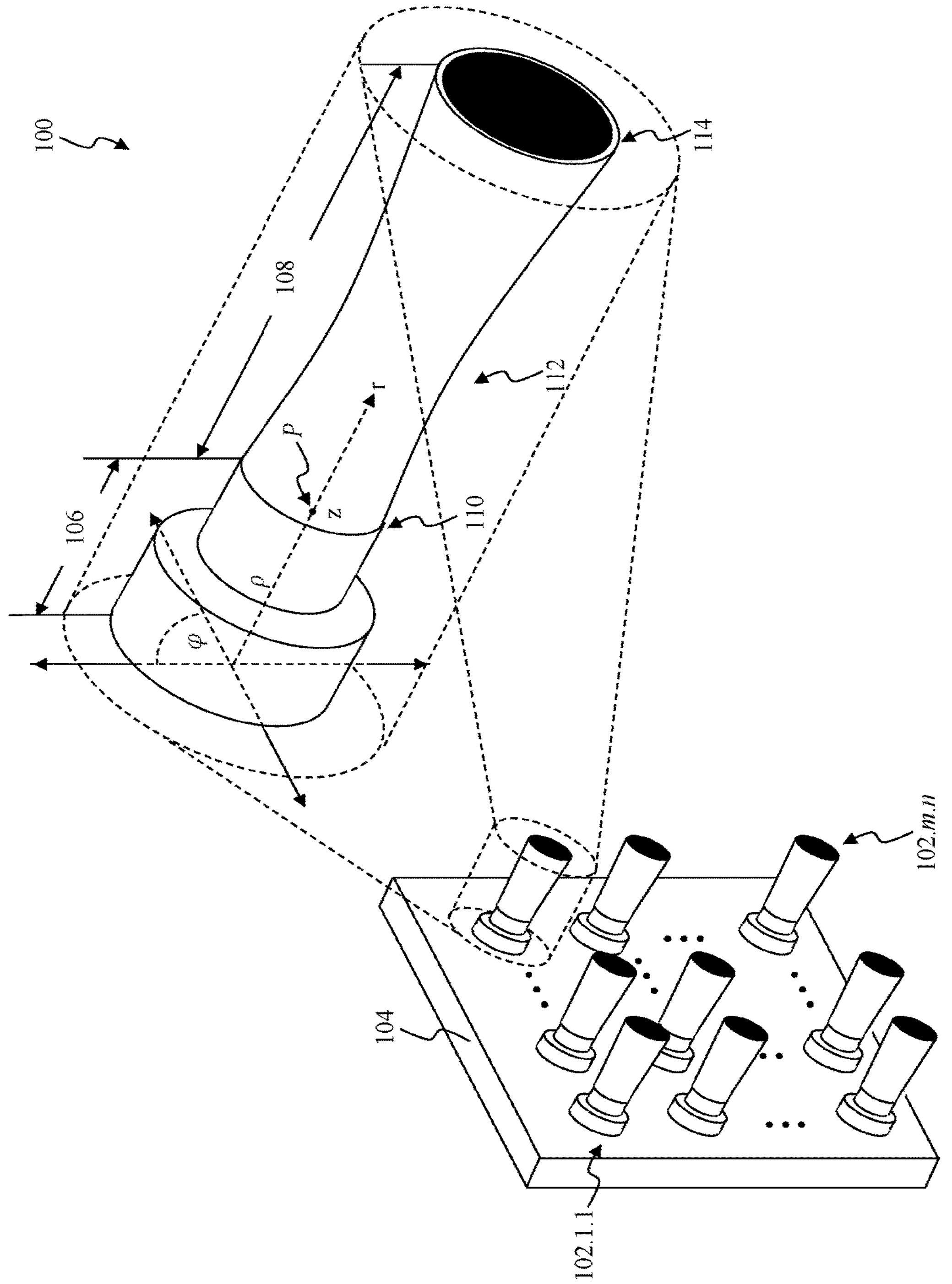
FIG. 1 graphically illustrates an exemplary coupled air amplifier array in accordance with some exemplary embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

Overview

An air amplifier utilizes a high-pressure input stream of air to accelerate a low-velocity input stream of air to provide a high-velocity, high-volume output stream of air. As to be described in further detail below, a coupled air amplifier array includes multiple air amplifiers which couple their respective high-velocity, high-volume output streams of air to one another to form a single collective high-velocity, high-volume output stream of air. In some embodiments to be described in further detail below, multiple coupled air amplifier arrays can be utilized to form coupled air amplifier array systems to provide multiple high-velocity, high-volume output streams of air which can be focused toward to an audience within a venue. As to be described in further detail below, the coupled air amplifier array system can be implemented within atmospheric effects systems to provide atmospheric effects, such as wind, scent, and/or temperature to provide some examples, relating to an event. These atmospheric effects systems can present these atmospheric effects to the audience to enhance the immersion of the audience as they are viewing the event. In some embodiments, these atmospheric effects systems can include multiple portable mobile effects pods that are situated within different locations within the venue to present these atmospheric effects to different locations with the venue.

Exemplary Coupled Air Amplifier Array

FIG. 1 graphically illustrates an exemplary coupled air amplifier array in accordance with some exemplary embodiments. In the exemplary embodiment illustrated in FIG. 1, a coupled air amplifier array 100 includes air amplifiers

102.1.1 through 102.*m*.*n* which utilize energy from a high-pressure input stream of air to accelerate a low-velocity input stream of air to provide high-velocity, high-volume output streams of air. As illustrated in FIG. 1, the air amplifiers 102.1.1 through 102.*m*.*n* are arranged in a series of m columns and a series of n rows to form a rectangular array of air amplifiers. However, other arrangements for the air amplifiers 102.1.1 through 102.*m*.*n* are possible without departing from the spirit and scope of the present disclosure. For example, the series of m columns and the series of n rows can be arranged to form other regular closed geometric arrays of air amplifiers and/or irregular closed geometric arrays of air amplifiers, such as an irregular polygonal array of air amplifiers to provide an example. Although the m columns of the air amplifiers 102.1.1 through 102.*m*.*n* and/or the n rows of the air amplifiers 102.1.1 through 102.*m*.*n* are illustrated as being symmetric, namely, including the same numbers of air amplifiers from among the air amplifiers 102.1.1 through 102.*m*.*n*, those skilled in the relevant art(s) will recognize that the m columns of the air amplifiers 102.1.1 through 102.*m*.*n* and/or then rows of the air amplifiers 102.1.1 through 102.*m*.*n* can be asymmetric, namely, including different numbers of air amplifiers from among the air amplifiers 102.1.1 through 102.*m*.*n*, without departing from the spirit and scope of the present disclosure. As illustrated in FIG. 1, the air amplifiers 102.1.1 through 102.*m*.*n* are mechanically coupled to, for example, mounted onto, a mechanical enclosure 104. In some embodiments, the mechanical enclosure 104 provides a mechanical separation between the low-velocity input stream of air and the high-velocity, high-volume output streams of air to mechanically isolate the low-velocity input stream of air and the high-velocity, high-volume output streams of air. This mechanical isolation prevents the low-velocity input stream of air from entraining air from the high-velocity, high-volume output streams of air as the air amplifiers 102.1.1 through 102.*m*.*n* are accelerating the low-velocity input stream of air.

As illustrated in FIG. 1, each of the air amplifiers 102.1.1 through 102.*m*.*n* include an air amplification engine 106 and an air guide 108. In the exemplary embodiment illustrated in FIG. 1, the air amplifiers 102.1.1 through 102.*m*.*n* include similar air amplification engines 106 and air guides 108 to one another; however, those skilled in the relevant art(s) will recognize that the air amplifiers 102.1.1 through 102.*m*.*n* can include different air amplification engines 106 and air guides 108 to one another without departing from the spirit and scope of the present disclosure. In the exemplary embodiment illustrated in FIG. 1, the air amplification engine 106 utilizes energy from the high-pressure input stream of air to accelerate the low-velocity input stream of air to provide a high-velocity, high-volume input stream of air. In some embodiments, the air amplification engine 106 can be implemented as an air volume amplifier or an air pressure amplifier. In these embodiments, the air volume amplifier and/or the air pressure amplifier can be implemented as standard, or fixed, air amplifiers or adjustable air amplifiers.

In the exemplary embodiment illustrated in FIG. 1, the air guide 108 shapes the high-velocity, high-volume input stream of air as the high-velocity, high-volume input stream of air propagates through the air guide 108 to provide a corresponding high-velocity, high-volume output stream of air from among the high-velocity, high-volume output streams of air. The air guide 108 can implemented using one or more rigid materials, such as one or more metals and/or one or more plastics to provide some examples, to provide a rigid, or fixed, air guide and/or a non-rigid, flexible material to provide a moveable, or adjustable, air guide. As illustrated in FIG. 1, the air guide 108 includes an air inflow 110 to receive the high-velocity, high-volume input stream of air from the air amplification engine 106, an air duct 112 to shape the high-velocity, high-volume input stream of air, and an air outflow 114 to further shape the high-velocity, high-volume input stream of air to provide the corresponding high-velocity, high-volume output stream of air. Generally, the air inflow 110 is implemented using a regular closed geometric opening that is compatible with the air amplification engine 106 and the air outflow 114 is implemented using a regular closed geometric opening to further shape the high-velocity, high-volume input stream of air as the high-velocity, high-volume input stream of air is departing the air guide 108. In the exemplary embodiment illustrated in FIG. 1, the air guide 108 is implemented using circular openings at the air inflow 110 and the air outflow 114. In this exemplary embodiment, a diameter of the circular opening at the air inflow 110 is less than a diameter of the circular opening at the air outflow 114 such that the air duct 112 approximates a tapered cylinder. However, those skilled in the relevant art(s) will recognize that the air inflow 110 and/or the air outflow 114 can be implemented using other regular closed geometric structures, irregular closed structures, such as one or more irregular polygons to provide an example, and/or any suitable combination of closed structures that will be apparent to those skilled in the relevant art(s) without departing from the spirit and scope of the present disclosure. As illustrated in FIG. 1, the air duct 112 can be gradually tapered to provide an exponential decrease of its cross-sectional area and/or an exponential decrease of its cross-sectional area to form a horn shape. As the high-velocity, high-volume input stream of air propagates through the air duct 112, the high-velocity, high-volume input stream of air follows this horn shape which shapes the high-velocity, high-volume input stream of air to provide a truncated cone as the corresponding high-velocity, high-volume output stream of air. However, those skilled in the relevant art(s) will recognize that the air duct 112 can be implemented using other configurations and arrangements to shape the high-velocity, high-volume input stream of air differently to provide other shapes for the corresponding output stream of air without departing from the spirit and scope of the present disclosure.

As illustrated in FIG. 1, the air amplifiers 102.1.1 through 102.*m*.*n* are spatially configured and arranged in relation to one another to couple, for example, to combine, to mix, and/or to blend, the high-velocity, high-volume output streams of air to one another to form a high-velocity, high-volume collective output stream of air. In the exemplary embodiment illustrated in FIG. 1, the air amplifiers 102.1.1 through 102.*m* can be separated by predetermined spatial distances from one another such that the high-velocity, high-volume output streams of air couple to one another. In some embodiments, the predetermined spatial distances between the air amplifiers 102.1.1 through 102.*m*.*n* can be the same predetermined spatial distance among the air amplifiers 102.1.1 through 102.*m*.*n* as illustrated in FIG. 1 or different predetermined spatial distances among the air amplifiers 102.1.1 through 102.*m*.*n*. In some embodiments, when the predetermined spatial distances between the air amplifiers 102.1.1 through 102.*m* is too large, for example, the air amplifiers 102.1.1 through 102.*m* are spaced too far apart, the high-velocity, high-volume output streams of air provided by the air amplifiers 102.1.1 through 102.*m* fail to couple, for example, combine, mix, and/or blend, with one another to form the high-velocity, high-volume collective output stream of air. In these embodiments, frictional forces opposing the high-velocity, high-volume output streams of air as the high-velocity, high-volume output streams of air propagate from the air amplifiers 102.1.1 through 102.*m* dissipates the high-velocity, high-volume output streams of air before the high-velocity, high-volume output streams of air couple to one another to form a high-velocity, high-volume collective output stream of air. As such, the high-velocity, high-volume output streams of air provided by the air amplifiers 102.1.1 through 102.*m* behave as individual output streams of air provided by the air amplifiers 102.1.1 through 102.*m* as opposed to the high-velocity, high-volume collective output stream of air. In some embodiments, as long as the predetermined spatial distances are within a range of predetermined spatial distances between the air amplifiers 102.1.1 through 102.*m.n*, the high-velocity, high-volume output streams of air couple to one another to form the high-velocity, high-volume collective output stream of air. In this embodiment, when the predetermined spatial distances between the air amplifiers 102.1.1 through 102.*m* is outside of this range of predetermined spatial distances, the high-velocity, high-volume output streams of air provided by the air amplifiers 102.1.1 through 102.*m* fail to couple, for example, combine, mix, and/or blend, with one another to form the high-velocity, high-volume collective output stream of air. In these embodiments, frictional forces opposing the high-velocity, high-volume output streams of air as the high-velocity, high-volume output streams of air propagate from the air amplifiers 102.1.1 through 102.*m* dissipates the high-velocity, high-volume output streams of air before the high-velocity, high-volume output streams of air couple to one another to form a high-velocity, high-volume collective output stream of air. As such, the high-velocity, high-volume output streams of air provided by the air amplifiers 102.1.1 through 102.*m* behave as individual output streams of air provided by the air amplifiers 102.1.1 through 102.*m* as opposed to the high-velocity, high-volume collective output stream of air.

Generally, the predetermined spatial distances can be related to one or more parameters, one or more characteristics, and/or one or more attributes of the air amplifiers 102.1.1 through 102.*m.n*. These parameters, characteristics, and/or attributes can include sizes, for example, lengths and/or widths of the air amplifiers 102.1.1 through 102.*m.n*, shapes, for example, shapes of the air inflow 110, the air duct 112, and/or the air outflow 114, and/or other physical specifications of the air amplifiers 102.1.1 through 102.*m.n*. In some embodiments, these parameters, characteristics, and/or attributes of the air amplifiers 102.1.1 through 102.*m.n* can be used to estimate volumetric propagates, typically expressed in cubic feet per minute (CFM), of the high-velocity, high-volume input stream of air needed to pass through the air amplifiers 102.1.1 through 102.*m.n* to the high-velocity, high-volume output streams of air. In these embodiments, these volumetric propagates can be used to determine minimum predetermined spatial distances between the air amplifiers 102.1.1 through 102.*m.n*. For example, if adjacent, neighboring air amplifiers from among the air amplifiers 102.1.1 through 102.*m.n* are spatially distanced too close to one another, then the volumetric flow of the a low-velocity input stream of air passing through these adjacent, neighboring air amplifiers 102.1.1 through 102.*m.n* may not be sufficient enough to provide their respective high-velocity, high-volume output streams of air. In some embodiments, these parameters, characteristics, and/or attributes of the air amplifiers 102.1.1 through 102.*m.n* can alternatively, or additionally, be used to estimate dispersions, typically expressed in terms of various angles, of the high-velocity, high-volume output streams of air as the high-velocity, high-volume output streams of air propagate from their respective air amplifiers 102.1.1 through 102.*m.n*. In these embodiments, these dispersions can be used to determine maximum predetermined spatial distances between the air amplifiers 102.1.1 through 102.*m.n*. For example, if adjacent, neighboring air amplifiers from among the air amplifiers 102.1.1 through 102.*m.n* are spatially distanced too far from one another, then the dispersions of their respective high-velocity, high-volume output streams of air can prevent their respective high-velocity, high-volume output streams of air from coupling to one another. In this example, adjacent, neighboring air amplifiers having narrower dispersions of their respective high-velocity, high-volume output streams of air can be spatially distanced closer to one another than neighboring air amplifiers having wider dispersions of their respective high-velocity, high-volume output streams of air.

In some embodiments, the air amplifiers 102.1.1 through 102.*m* can be spatially aligned with respect to one another such that the high-velocity, high-volume output streams of air couple to one another. In the exemplary embodiment illustrated in FIG. 1, air amplifiers 102.1.1 through 102.*m* can be characterized using polar cylindrical coordinate systems. As illustrated in FIG. 1, the air amplifiers 102.1.1 through 102.*m* can be approximated by mathematical rays r extending from a reference plane, such as x-y planes of a Cartesian coordinate system to provide an example, through points P. As illustrated in FIG. 1, the points P can be represented by (ρ, φ, z), where the axial distances or radial distances ρ represent distances from origins of the mathematical rays r on the reference plane to the points P, the azimuth angles φ represent the angles between reference directions on the reference plane and lines from the origins of the mathematical rays r to the projections of points P on the reference plane, and the axial coordinates or heights z represent distances from the reference plane to the points P. Generally, the spatial alignment of the air amplifiers 102.1.1 through 102.*m* can be related to the one or more parameters, the one or more characteristics, and/or the one or more attributes of the air amplifiers 102.1.1 through 102.*m.n* as described above. As described above, these parameters, characteristics, and/or attributes of the air amplifiers 102.1.1 through 102.*m.n* can be used to estimate dispersions, typically expressed in terms of various angles, of the high-velocity, high-volume output streams of air as the high-velocity, high-volume output streams of air propagate from their respective air amplifiers 102.1.1 through 102.*m.n*. In these embodiments, these dispersions can be used to determine the spatial alignment of air amplifiers 102.1.1 through 102.*m* with respect to one another. In some embodiments, the air amplifiers 102.1.1 through 102.*m* can be spatially aligned to be normal, or approximately normal to the reference plane as described above. In some embodiments, the mathematical rays r approximating adjacent, neighboring adjacent air amplifiers 102.1.1 through 102.*m* can be angularly offset from each of other by a splay angle, such as approximately 20 degrees to provide an example. In these embodiments, one of these mathematical rays r can be normal to the reference plane as described above with another one of these mathematical rays r being angularly offset from this mathematical ray by the splay angle. In some embodiments, if the splay angles between the air amplifiers 102.1.1 through 102.*m* is too large, the high-velocity, high-volume output streams of air provided by the air amplifiers 102.1.1 through 102.*m* fail to couple, for example, combine, mix, and/or blend, with one another to form the high-velocity, high-volume collective output stream of air. In these embodiments, frictional forces opposing the high-velocity, high-volume output streams of air as the high-velocity, high-volume output streams of air propagate from the air amplifiers 102.1.1 through **102.*m* dissipates the high-velocity, high-volume output streams of air before the high-velocity, high-volume output streams of air couple to one another to form a high-velocity, high-volume collective output stream of air. As such, the high-velocity, high-volume output streams of air provided by the air amplifiers 102.1.1 through 102.*m* behave as individual output streams of air provided by the air amplifiers 102.1.1 through 102.*m*** as opposed to the high-velocity, high-volume collective output stream of air.

Exemplary Operation of the Exemplary Coupled Air Amplifier Array

FIG. 2A through FIG. 2D graphically illustrate an exemplary operation of the exemplary coupled air amplifier array in accordance with some exemplary embodiments. In the exemplary embodiment illustrated in FIG. 2A through FIG. 2D, a coupled air amplifier array 200 includes air amplifiers 202.1.1 through 202.2.2 which utilize energy from a high-pressure input stream of air 250 to accelerate a low-velocity input stream of air 252 to provide high-velocity, high-volume output streams of air 254.1.1 through 254.2.2 which thereafter couple to one another to form a high-velocity, high-volume collective output stream of air 256. In some embodiments, the air amplifiers 202.1.1 through 202.2.2 can represent exemplary embodiments of one or more of the air amplifiers 102.1.1 through **102.*m.n* as described above in FIG. 1. Although the discussion of FIG. 2A through FIG. 2D to follow is describe the exemplary operation of the coupled air amplifier array 200 having the air amplifiers 202.1.1 through 202.2.2**, those skilled in the relevant art(s) will recognize the teachings herein are similarly applicable to other coupled air amplifier arrays having other numbers of air amplifiers without departing from the spirit and scope of the present disclosure.

Figure 2B:
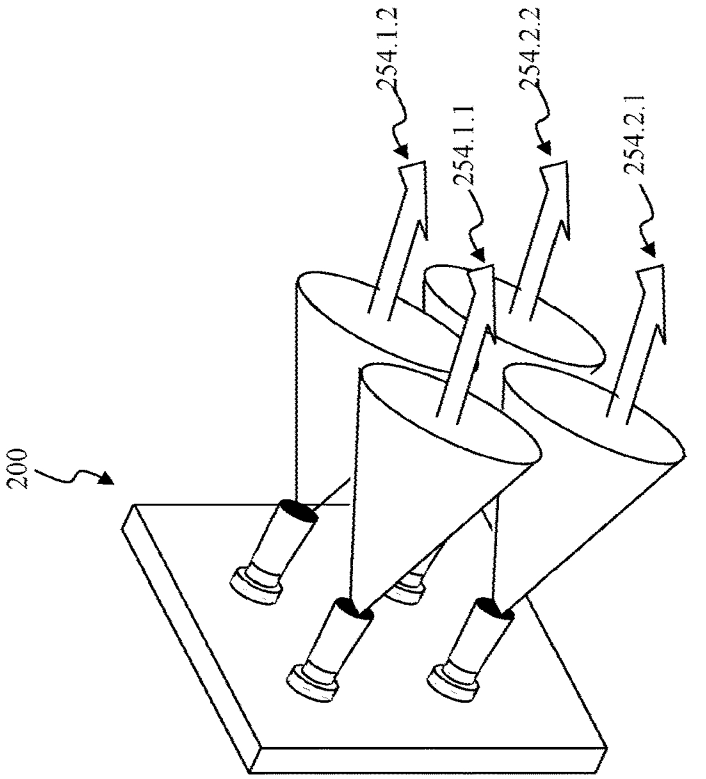
FIG. 2A through FIG. 2D graphically illustrate an exemplary operation of the exemplary coupled air amplifier array in accordance with some exemplary embodiments.
Figure 2A:
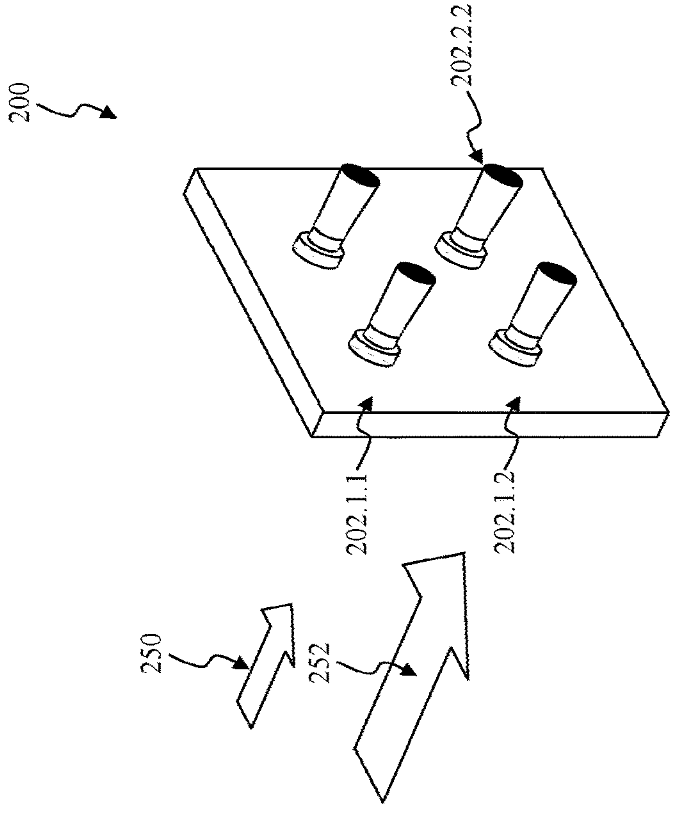

As illustrated in FIG. 2A, the air amplifiers 202.1.1 through 202.2.2 receive the high-pressure input stream of air 250 and the low-velocity input stream of air 252, also referred to as ambient air, which surrounds the coupled air amplifier array 200. In the exemplary embodiment illustrated in FIG. 2B, the air amplifiers 202.1.1 through 202.2.2 utilize the kinetic energy of the high-pressure input stream of air 250 to accelerate the low-velocity input stream of air 252. As the high-pressure input stream of air 250 enters into the air amplifiers 202.1.1 through 202.2.2, the high-pressure input stream of air 250 follows the inner profiles of the air amplifiers 202.1.1 through 202.2.2 in accordance with the well-known Coandă effect creating spatial volumes of low pressure within the air amplifiers 202.1.1 through 202.2.2. The low-velocity input stream of air 252, which is at a higher pressure than the spatial volumes of low pressure, propagates through these spatial volumes of low pressure within the air amplifiers 202.1.1 through 202.2.2 and is accelerated by the kinetic energy of the high-pressure input stream of air 250 to provide high-velocity, high-volume flows of the input stream of air 252 in accordance with the well-known Venturi effect. The air amplifiers 202.1.1 through 202.2.2 thereafter shape the high-volume flow of the input stream of air 252 as the high-volume flow of the input stream of air 252 propagates through the air amplifiers 202.1.1 through 202.2.2 in a substantially similar manner as described above in FIG. 1 to provide the high-velocity, high-volume output streams of air 254.1.1 through 254.2.2.

Figure 2D:
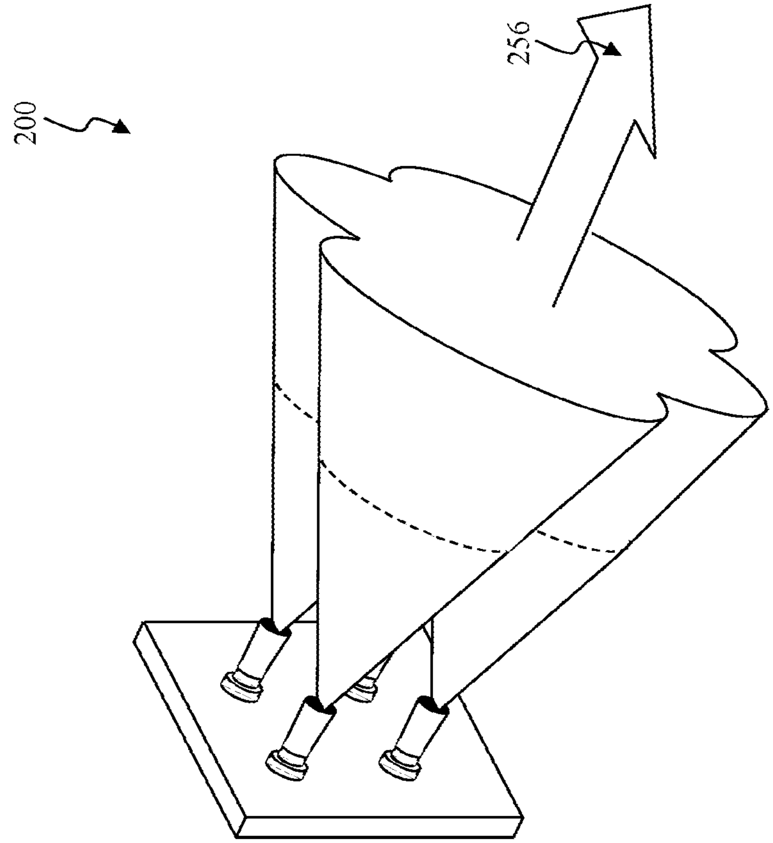
Figure 2C:
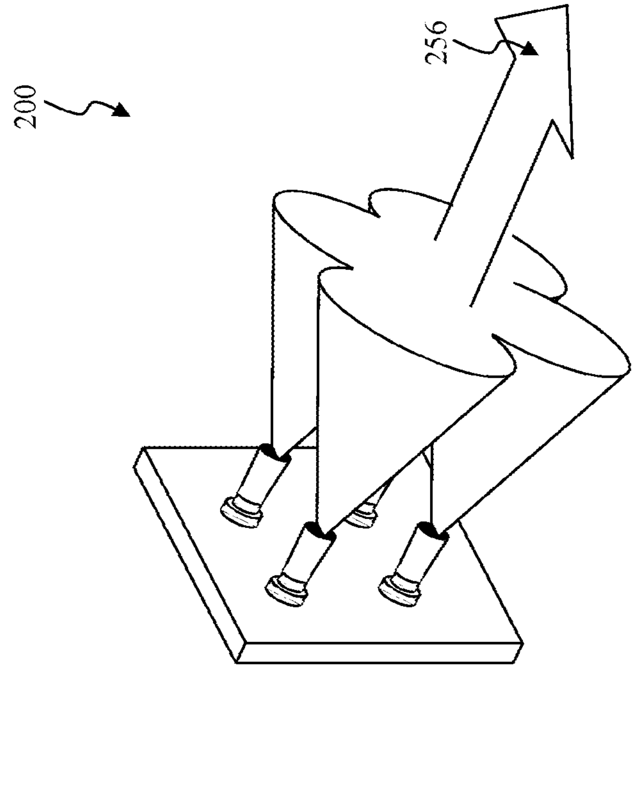

In the exemplary embodiment illustrated in FIG. 2B, the air amplifiers 202.1.1 through 202.2.2 are spatially configured and arranged in relation to one another, as described above, to couple, for example, to combine, to mix, and/or to blend, the high-velocity, high-volume output streams of air 254.1.1 through 254.2.2 to one another to form the high-velocity, high-volume collective output stream of air 256. As illustrated in FIG. 2B, the high-velocity, high-volume output streams of air 254.1.1 through 254.2.2 collide with one another to couple, for example, to combine, to mix, and/or to blend, the high-velocity, high-volume output streams of air 254.1.1 through 254.2.2 to one another to form the high-velocity, high-volume collective output stream of air 256 which propagates from the air amplifiers 202.1.1 through 202.2.2 as illustrated in FIG. 2D. In the exemplary embodiment illustrated in FIG. 2A through 2D, the air amplifiers 202.1.1 through 202.2.2 are spatially configured and arranged in relation to one another to couple, for example, to combine, to mix, and/or to blend, the high-velocity, high-volume output streams of air 254.1.1 through 254.2.2 to one another to form the high-velocity, high-volume collective output stream of air 256 in a similar manner as described above in FIG. 1.

Figure 3A:
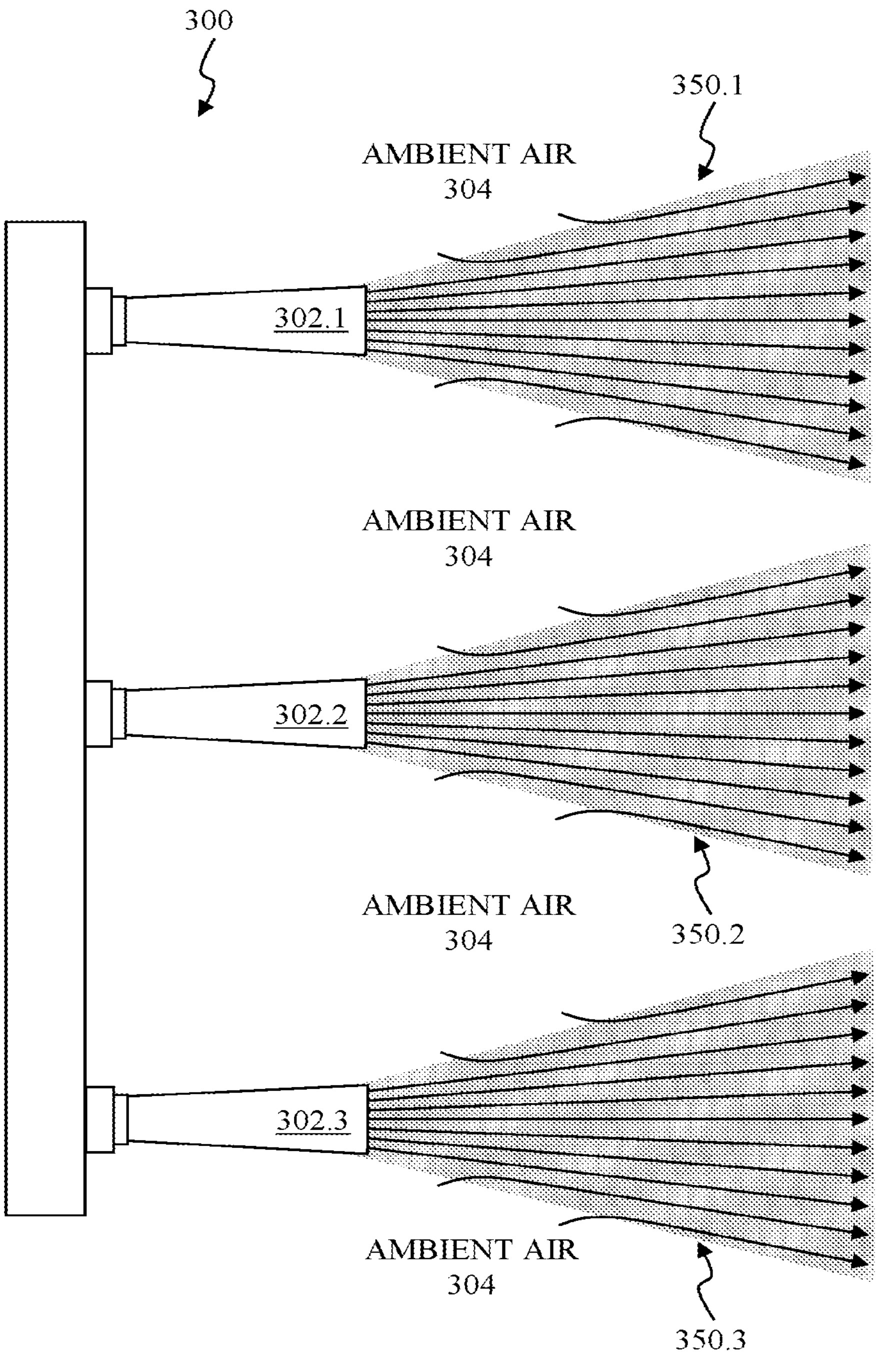
FIG. 3A through FIG. 3C graphically illustrate an exemplary coupling of exemplary high-velocity, high-volume output streams from the exemplary coupled air amplifier array in accordance with some exemplary embodiments.
Figure 3B:
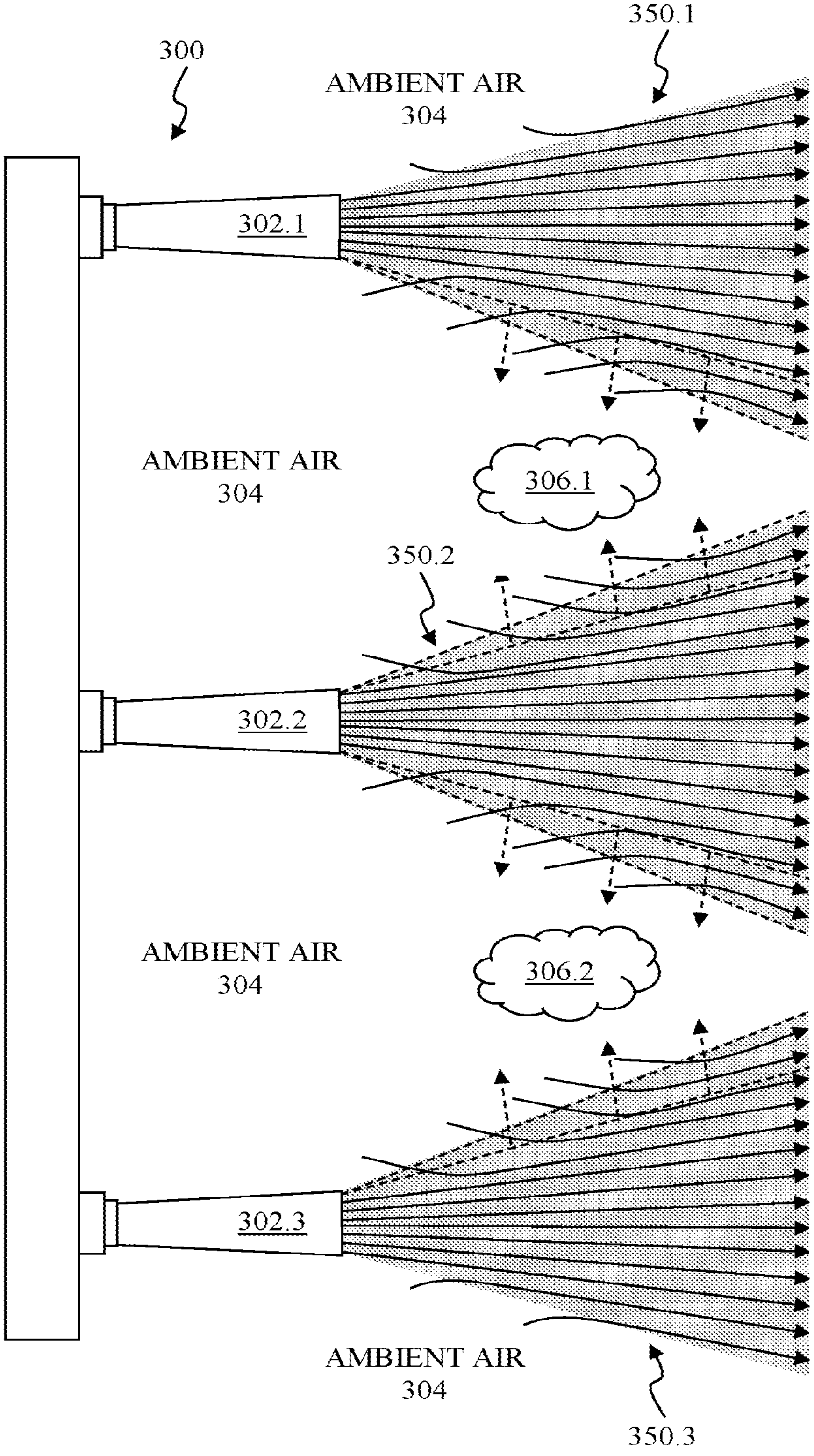
Figure 3C:
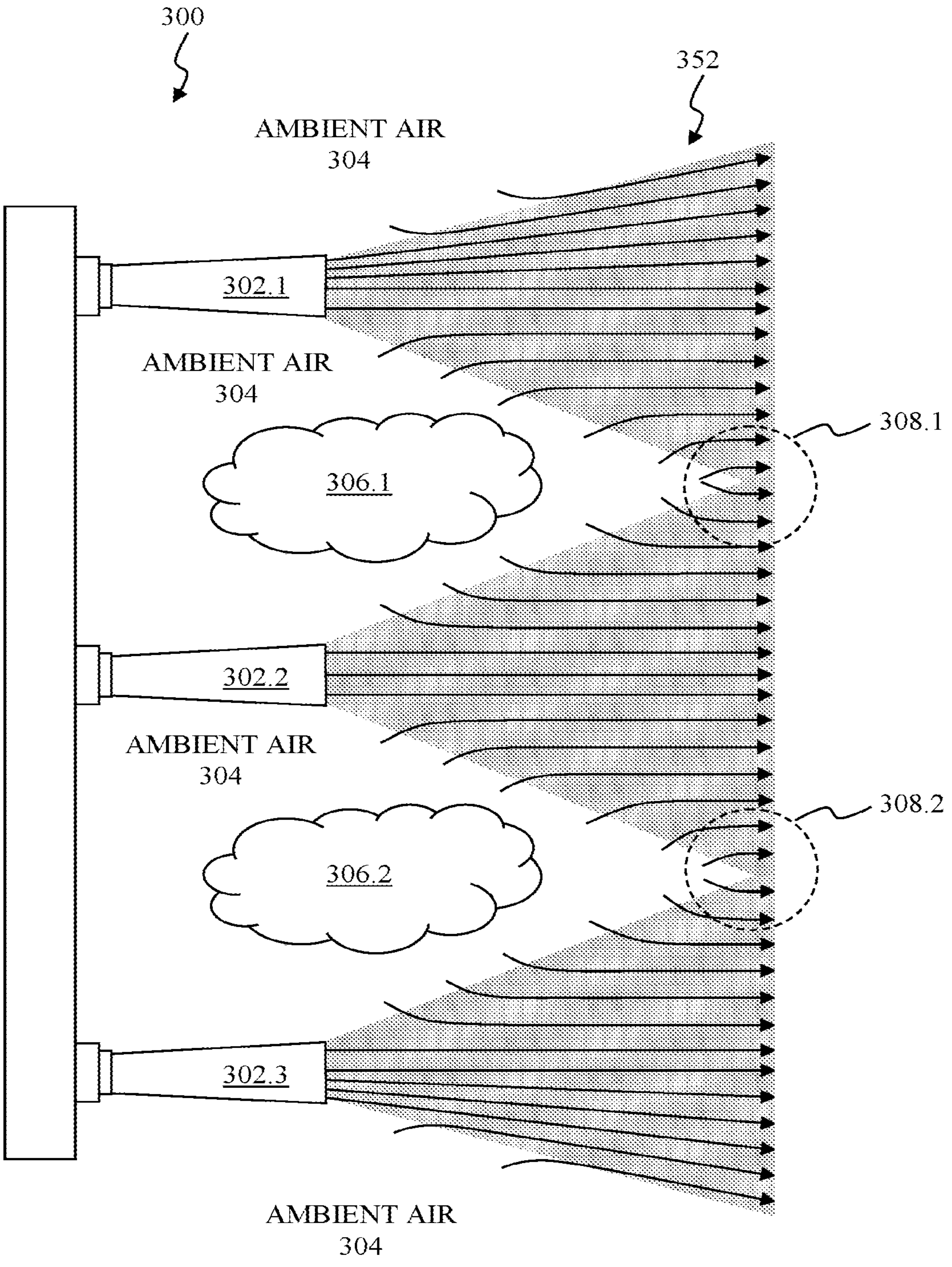

Exemplary Coupling of High-Velocity, High-Volume Output Streams of Air from the Exemplary Coupled Air Amplifier Array FIG. 3A through FIG. 3C graphically illustrate an exemplary coupling of exemplary high-velocity, high-volume output streams from the exemplary coupled air amplifier array in accordance with some exemplary embodiments. In the exemplary embodiments illustrated in FIG. 3A through FIG. 3C, a coupled air amplifier array 300 includes air amplifiers 302.1 through 302.3 which provide high-velocity, high-volume output streams of air 350.1 through 350.3. In these embodiments, the air amplifiers 302.1 through 302.3 are spatially configured and arranged in relation to one another, as described above, to couple, for example, to combine, to mix, and/or to blend, the high-velocity, high-volume output streams of air 350.1 through 350.3 to one another to form a high-velocity, high-volume collective output stream of air 352. FIG. 3A through FIG. 3C graphically illustrate cross-sectional views of the coupled air amplifier array 300 having cross-sectional views of the air amplifiers 302.1 through 302.3, the high-velocity, high-volume output streams of air 350.1 through 350.3, and/or the high-velocity, high-volume collective output stream of air 352. In some embodiments, the coupled air amplifier array 300 can represent an exemplary embodiment of the coupled air amplifier array 100 as described above in FIG. 1 and/or the coupled air amplifier array 100 as described above in FIG. 2A through FIG. 2D. Although the discussion of FIG. 3A through FIG. 3C to follow is describe the exemplary operation of the coupled air amplifier array having the air amplifiers 302.1 through 302.3, those skilled in the relevant art(s) will recognize the teachings herein are similarly applicable to other coupled air amplifier arrays having more or less air amplifiers without departing from the spirit and scope of the present disclosure.

In the exemplary embodiment illustrated in FIG. 3A, the air amplifiers 302.1 through 302.3 utilize the kinetic energy of a high-pressure input stream of air, such as the high-pressure input stream of air 250 as described above in FIG. 2A through FIG. 2D to provide an example, to accelerate a low-velocity input stream of air, such as the low-velocity input stream of air 252 as described above in FIG. 2A through FIG. 2D to provide an example, to provide high-velocity, high-volume flows of the input stream of air in a similar manner as described above in FIG. 1 and FIG. 2A through FIG. 2D. The air amplifiers 302.1 through 302.3 thereafter shape the high-velocity, high-volume flows of the input stream of air as the high-velocity, high-volume flows of the input stream of air propagate through the air amplifiers 302.1 through 302.3 in a substantially similar manner as described above in FIG. 1 to provide the high-velocity, high-volume output streams of air 350.1 through 350.3. In the exemplary embodiment illustrated in FIG. 3A, the high-velocity, high-volume output streams of air 350.1 through 350.3 are illustrated using a dark gray shading with arrows indicating the flow direction of the high-velocity, high-volume output streams of air 350.1 through 350.3 from the air amplifiers 302.1 through 302.3. Moreover, in the exemplary embodiment illustrated in FIG. 3A, as the high-velocity, high-volume output streams of air 350.1 through 350.3 propagate away from their respective air amplifiers 302.1 through 302.3, the high-velocity, high-volume output streams of air 350.1 through 350.3 can entrain ambient air 304 surrounding the high-velocity, high-volume output streams of air 350.1 through 350.3 into the high-velocity, high-volume output streams of air 350.1 through 350.3. In some embodiments, the high-velocity, high-volume output streams of air 350.1 through 350.3 can be characterized as having a lower pressure than the ambient air 304 surrounding the high-velocity, high-volume output streams of air 350.1 through 350.3. In these embodiments, the ambient air 304 surrounding the high-velocity, high-volume output streams of air 350.1 through 350.3 at this higher pressure can be entrained onto these lower pressure, high-velocity, high-volume output streams of air 350.1 through 350.3.

In the exemplary embodiment illustrated in FIG. 3B, the high-velocity, high-volume output streams of air 350.1 through 350.3 can create spatial volumes of lower-pressure, also referred to as spatial vacuums 308.1 and 308.2, between one another as the high-velocity, high-volume output streams of air 350.1 through 350.3 propagate away from the air amplifiers 302.1 through 302.3. Unlike the ambient air 304 surrounding the high-velocity, high-volume output streams of air 350.1 through 350.3 which can be characterized as being an infinite spatial volume, the ambient air 304 between the high-velocity, high-volume output streams of air 350.1 through 350.3 can be characterized as being finite spatial volumes. The pressures of the ambient air 304 within these finite spatial volumes decrease as the ambient air 304 from these finite volumes are entrained onto the high-velocity, high-volume output streams of air 350.1 through 350.3. As more of the ambient air 304 within these finite spatial volumes is entrained onto the high-velocity, high-volume output streams of air 350.1 through 350.3, the pressures of the ambient air 304 within these finite spatial volumes continue to decrease creating the spatial vacuums 308.1 and 308.2. In some embodiments, the spatial vacuums 306.1 and 306.2 entrain air from the higher-pressure, high-velocity, high-volume output streams of air 350.1 through 350.3 to attract the high-velocity, high-volume output streams of air 350.1 through 350.3 toward the spatial vacuums 306.1 and 306.2. For example, as illustrated in FIG. 3B, various interfaces or boundaries, which are represented by dashed lines in FIG. 3B, between the ambient air 304 and the high-velocity, high-volume output streams of air 350.1 through 350.3 are drawn toward the spatial vacuums 308.1 and 308.2

In the exemplary embodiment illustrated in FIG. 3C, the pressures of the spatial vacuums 306.1 and 306.2 continue to decrease as more ambient air 304 from these finite volumes is entrained onto the high-velocity, high-volume output streams of air 350.1 through 350.3 which simultaneously increases the attraction of the high-velocity, high-volume output streams of air 350.1 through 350.3 toward the spatial vacuums 306.1 and 306.2. As illustrated in FIG. 3C, the pressures of the spatial vacuums 306.1 and 306.2 have sufficiently decreased to cause the high-velocity, high-volume output streams of air 350.1 through 350.3 to collide with one another as illustrated in the dotted circles 308.1 and 308.2 in FIG. 3C. In the exemplary embodiment illustrated in FIG. 3C, this collision of the high-velocity, high-volume output streams of air 350.1 through 350.3 couple the high-velocity, high-volume output streams of air 350.1 through 350.3 to one another to form the high-velocity, high-volume collective output stream of air 352. In some embodiments, this collision of the high-velocity, high-volume output streams of air 350.1 through 350.3 can additionally alter one or more propagation characteristics, such as, flow direction to provide some examples, of the high-velocity, high-volume collective output stream of air 352. As illustrated in FIG. 3C, the flow direction of the high-velocity, high-volume collective output stream of air 352 can be characterized as being more perpendicularly outward, for example, more normal, from the air amplifiers 302.1 through 302.3, especially where the high-velocity, high-volume output streams of air 350.1 through 350.3 have collided with one another, when compared to the high-velocity, high-volume output streams of air 350.1 through 350.3 as illustrated in FIG. 3A and FIG. 3B.

Figure 4:
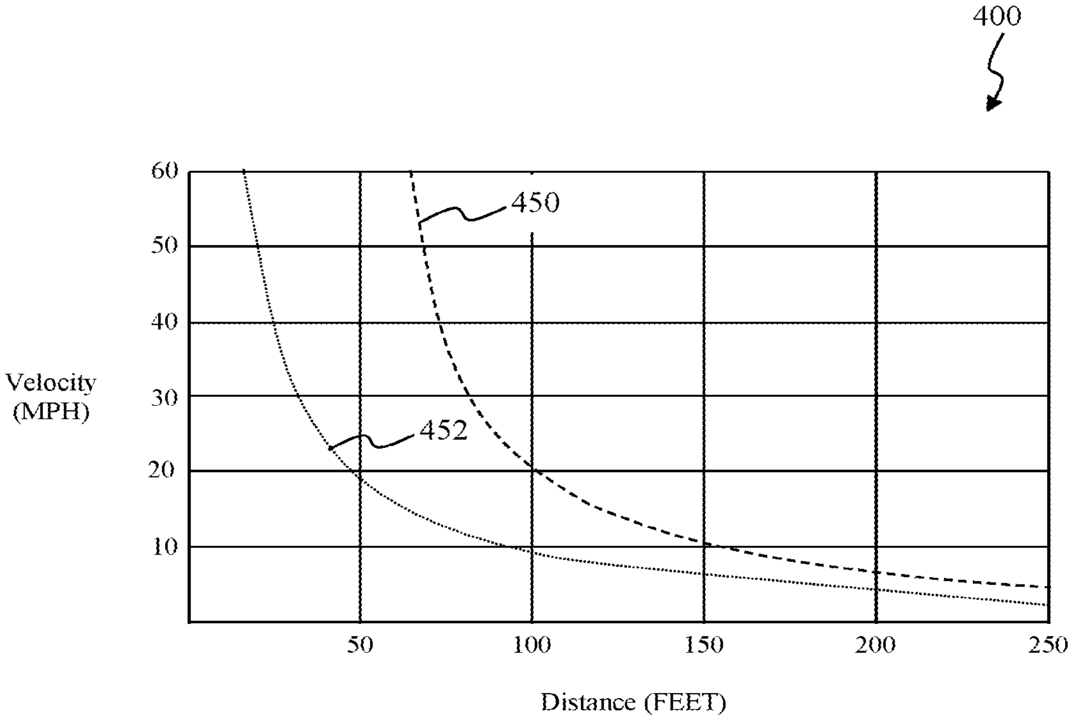
FIG. 4 graphically illustrates exemplary characteristics of an exemplary high-velocity collective output stream in accordance with some exemplary embodiments.

FIG. 4 graphically illustrates exemplary characteristics of an exemplary high-velocity collective output stream in accordance with some exemplary embodiments. As described above in FIG. 1, FIG. 2A through FIG. 2D, and FIG. 3A through FIG. 3C, a coupled air amplifier array, such as the coupled air amplifier array 100 as described above in FIG. 1, the coupled air amplifier array 200 as described above in FIG. 2A through FIG. 2D, and FIG. 3A, and/or the coupled air amplifier array 300 as described above FIG. 3A through FIG. 3C, provides high-velocity, high-volume output streams of air which collide with one another to couple the high-velocity, high-volume output streams of air to one another to form a high-velocity, high-volume collective output stream of air 450. FIG. 4 illustrates an air stream dispersion graph 400 comparing a velocity of the high-velocity, high-volume collective output stream of air 450, measured in miles per hour (MPH), with a velocity of a high-velocity, high-volume output stream of air 452 from among the high-velocity, high-volume output streams of air over distance. In the exemplary embodiment illustrated in FIG. 4, the high-velocity, high-volume collective output stream of air 450 can be characterized as having a greater spatial volume and/or a greater velocity than the high-velocity, high-volume output stream of air 452 over distance. As described above in FIG. 3A through FIG. 3C, the high-velocity, high-volume output streams of air can entrain ambient air surrounding the high-velocity, high-volume output streams of air as the high-velocity, high-volume output streams of air propagate from the coupled air amplifier array which increases the spatial volume of the high-velocity, high-volume output streams of air. And as illustrated in FIG. 4, the high-velocity, high-volume collective output stream of air 450 can be characterized as having a greater velocity than the high-velocity, high-volume output stream of air 452 over distance. For example, at a distance of approximately 100 feet, the high-velocity, high-volume collective output stream of air 450 has a measured velocity of approximately 20 MPH as compared to the measured velocity of approximately 10 MPH of the high-velocity, high-volume output stream of air 452. And, as described above in FIG. 1, FIG. 2A through FIG. 2D, and FIG. 3A through FIG. 3C, the high-velocity, high-volume output streams of air collide with one another to couple, for example, to combine, to mix, and/or to blend, the high-velocity, high-volume output streams of air to one another to form the high-velocity, high-volume collective output stream of air 450. In some embodiments, this collision of the high-velocity, high-volume output streams of air can additionally alter one or more propagation characteristics, such as, flow direction to provide some examples, of the high-velocity, high-volume collective output stream of air 450, which as illustrated in FIG. 4 increases the velocity of the high-velocity, high-volume collective output stream of air 450 over distance when compared to the high-velocity, high-volume output stream of air 452.

Exemplary Coupled Air Amplifier Array Systems

Figure 5A:
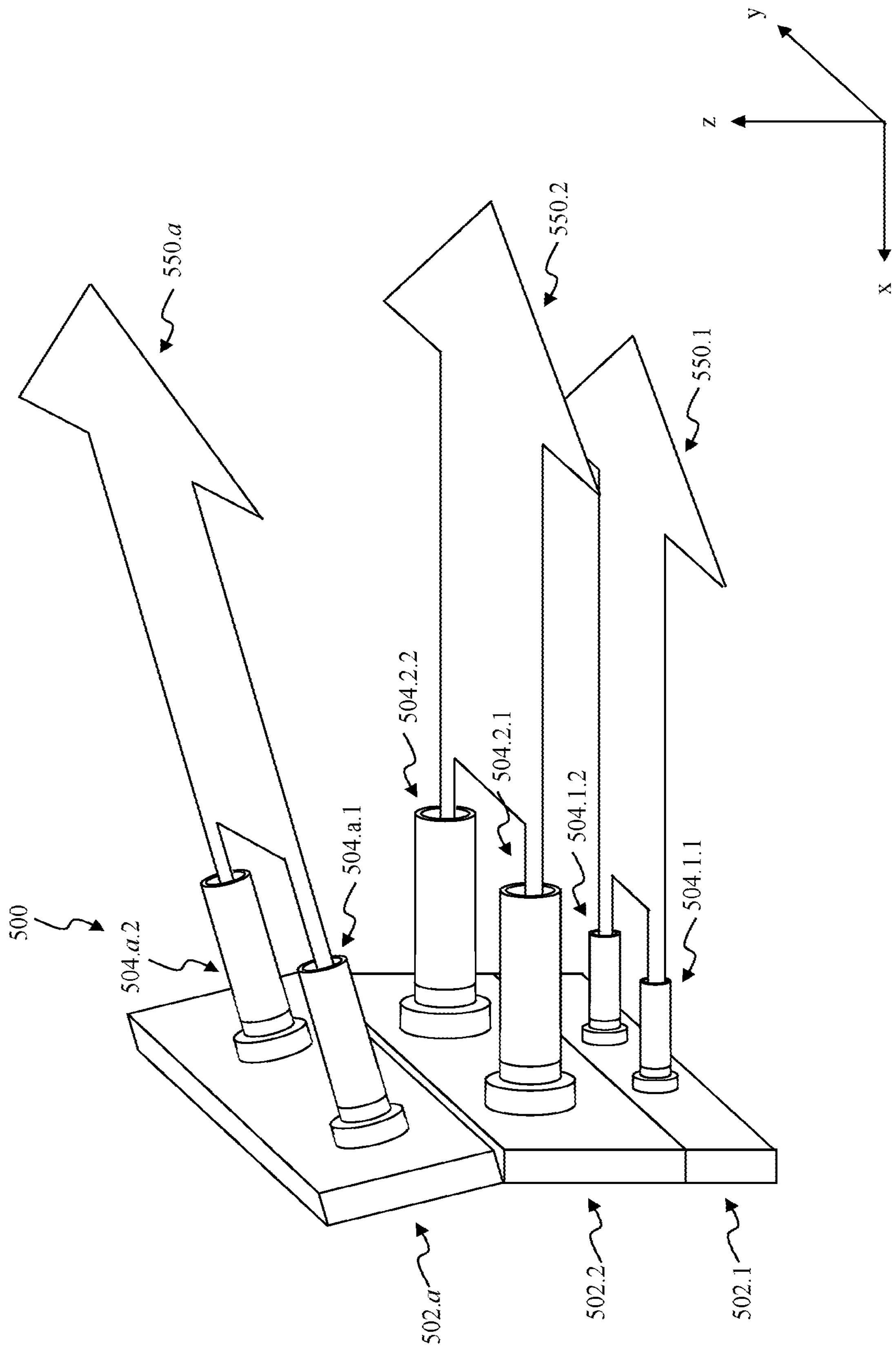
FIG. 5A and FIG. 5B graphically illustrate exemplary coupled air amplifier systems having multiple exemplary coupled air amplifier arrays in accordance with some exemplary embodiments.
Figure 5B:
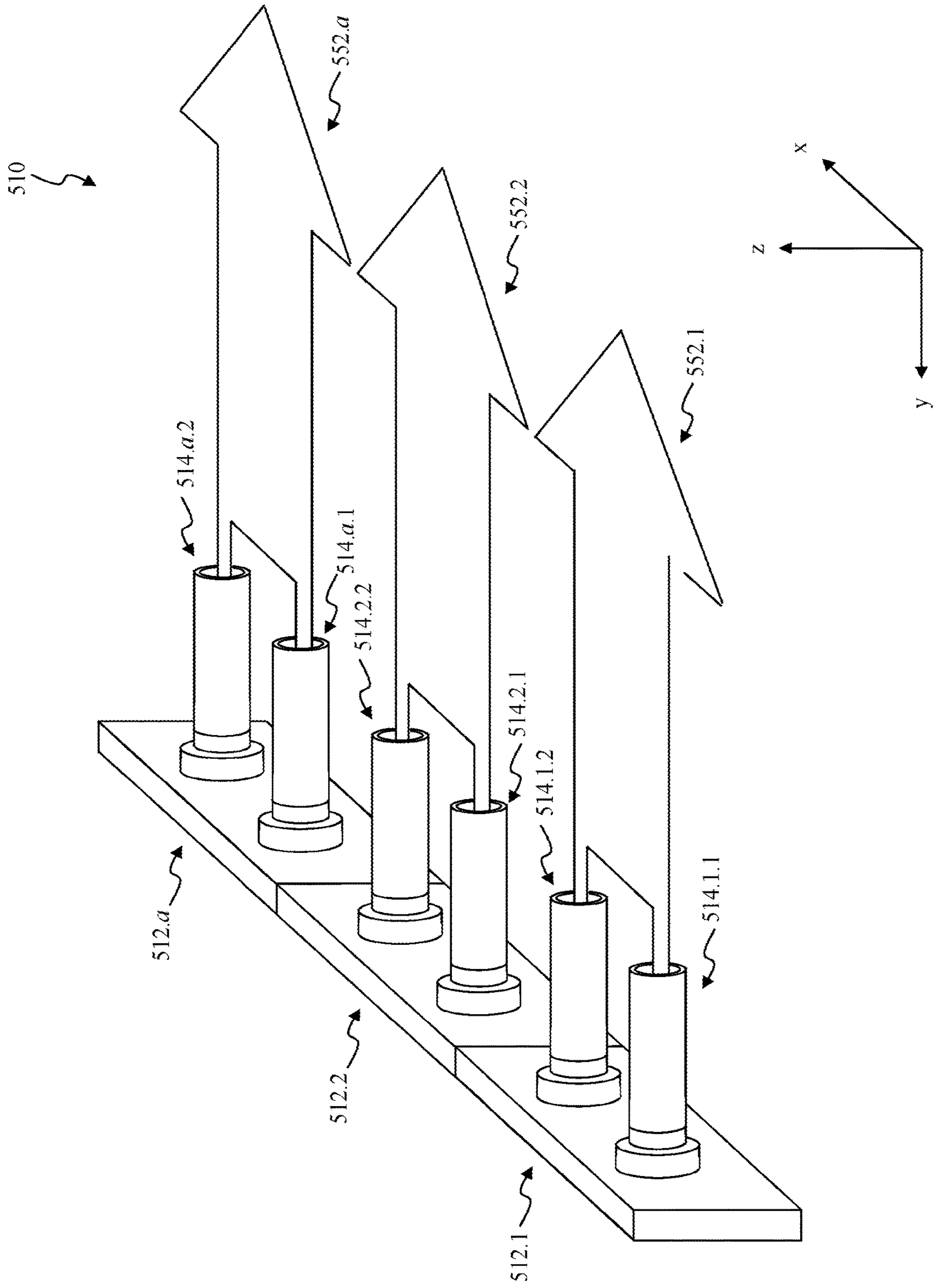

FIG. 5A and FIG. 5B graphically illustrate exemplary coupled air amplifier systems having multiple exemplary coupled air amplifier arrays in accordance with some exemplary embodiments. In the exemplary embodiments illustrated in FIG. 5A and FIG. 5B, coupled air amplifier arrays, such as one or more of the coupled air amplifier array 100 as described above in FIG. 1, the coupled air amplifier array 200 as described above in FIG. 2A through FIG. 2D, the coupled air amplifier array 300 as described above FIG. 3A through FIG. 3C, and/or any combination thereof, can be configured and arranged in a horizontal direction and/or a vertical direction to form a coupled air amplifier system 500 as illustrated in FIG. 5A and/or a coupled air amplifier system 510 as illustrated in FIG. 5B. In the exemplary embodiment illustrated in FIG. 5A and FIG. 5B, the coupled air amplifier system 500 and the coupled air amplifier system 510 include coupled air amplifier arrays 502.1 through 502.*a* having air amplifiers 504.1.1 through 504.*a*.2 and coupled air amplifier arrays 512.1 through 512.*a* air amplifiers 514.1.1 through 514.*a*.2, respectively. In some embodiments, the air amplifiers 504.1.1 through 504.*a*.2 and/or the air amplifiers 514.1.1 through 514.*a*.2 can represent exemplary embodiments of one or more of the air amplifiers 102.1.1 through 102.*m*.*n* as described above in FIG. 1, one or more of the air amplifiers 202.1.1 through 202.2.2 as described above in FIG. 2A through FIG. 2D, and/or one or more of the air amplifiers 302.1 through 302.3 as described above in FIG. 3A through FIG. 3C. However, those skilled in the relevant art(s) will recognize the teachings herein are similarly applicable to other coupled air amplifier array systems having more or less coupled air amplifier arrays having more or less air amplifiers without departing from the spirit and scope of the present disclosure. Moreover, although the coupled air amplifier arrays 502.1 through 502.*a* as illustrated in FIG. 5A and the coupled air amplifier arrays 512.1 through 512.*a* as illustrated in FIG. 5B are illustrated as being similar to each other, those skilled in the relevant art(s) will recognize that one or more of the coupled air amplifier arrays 502.1 through 502.*a* and/or one or more of the coupled air amplifier arrays 512.1 through 512.*a* can differ from one another without departing from the spirt and scope of the present disclosure.

In the exemplary embodiment illustrated in FIG. 5A, the coupled air amplifier system 500 includes coupled air amplifier arrays 502.1 through 502.*a* having the air amplifiers 504.1.1 through 504.*a*.2 that configured and arranged in a series of two-columns and a series of a-rows. As illustrated in FIG. 5A, the coupled air amplifier arrays 502.1 through 502.*a* can be configured and arranged in along a vertical direction, such as a z-axis of a Cartesian coordinate system to provide an example, to form the coupled air amplifier system 500. In the exemplary embodiment illustrated in FIG. 5A, the coupled air amplifier arrays 502.1 through 502.*a* can provide high-velocity collective output streams of air 550.1 through 550.*a* in substantially similar manner as described above in FIG. 1, FIG. 2A through FIG. 2D, FIG. 3A through FIG. 3C, and/or FIG. 4. As illustrated in FIG. 5A, the coupled air amplifier array 502.2 is vertically stacked on top of the coupled air amplifier array 502.1 and the coupled air amplifier array 502.*a* is vertically stacked on top of the coupled air amplifier array 502.2. Moreover, as illustrated in FIG. 5A, the coupled air amplifier array 502.*a* can be angularly offset, for example, tilted, from the coupled air amplifier array 502.2 by a tilt angle, for example, fifteen (15) degrees.

The configuration and arrangement of the coupled air amplifier arrays 502.1 through 502.*a* as illustrated in FIG. 5A allows the coupled air amplifier arrays 502.1 through 502.*a* to focus the high-velocity collective output streams of air 550.1 through 550.*a* toward different vertical distances within a reference coordinate system, such as different z-coordinates of the Cartesian coordinate system to provide an example. In the exemplary embodiment illustrated in FIG. 5A, the coupled air amplifier array 502.1 focuses the high-velocity, high-volume collective output stream of air 550.1 toward a first z-coordinate of the Cartesian coordinate system. The coupled air amplifier array 502.2 focuses the high-velocity, high-volume collective output stream of air 550.2 toward a second z-coordinate of the Cartesian coordinate system that is greater than the first z-coordinate. The coupled air amplifier array 502.*a* focuses the high-velocity, high-volume collective output stream of air 550.*a* toward an $a^{th}$ z-coordinate of the Cartesian coordinate system that is greater than the second z-coordinate.

In the exemplary embodiment illustrated in FIG. 5A, the air amplifiers 504.1.1 through 504.*a*.2 can provide the high-velocity collective output streams of air 550.1 through 550.*a* in substantially similar manner as described above in FIG. 1, FIG. 2A through FIG. 2D, FIG. 3A through FIG. 3C, and/or FIG. 4. In some embodiments, the air amplifiers 504.1.1 through 504.*a*.2 can be similar to one another and/or different from each other as illustrated in FIG. 5A. In the exemplary embodiment illustrated in FIG. 5A, the air amplifiers 504.2.1 and 504.2.2 can be characterized as being larger than the air amplifiers 504.*a*.1 and 504.*a*.2 and the air amplifiers 504.*a*.1 and 504.*a*.2 can be characterized as being larger than the air amplifiers 504.1.1 and 504.1.2. In this exemplary embodiment, the high-velocity, high-volume collective output stream of air 550.2 can be characterized as having a larger spatial volume and/or a larger velocity over distance than the high-velocity, high-volume collective output stream of air 550.*a* and the high-velocity, high-volume collective output stream of air 550.*a* can be characterized as having a larger spatial volume and/or a larger velocity over distance than the high-velocity, high-volume collective output stream of air 550.1.

In the exemplary embodiment illustrated in FIG. 5B, the coupled air amplifier system 510 includes the coupled air amplifier arrays 512.1 through 512.*a* having the air amplifiers 514.1.1 through 514.*a*.2 that configured and arranged in a series of a-columns and a single row. As illustrated in FIG. 5B, coupled air amplifier arrays 512.1 through 512.*a* can be configured and arranged in along a horizontal direction, such as an x-axis of a Cartesian coordinate system to provide an example, to form the coupled air amplifier system 510. In the exemplary embodiment illustrated in FIG. 5B, the coupled air amplifier arrays 512.1 through 512.*a* can provide high-velocity collective output streams of air 552.1 through 552.*a* in substantially similar manner as described above in FIG. 1, FIG. 2A through FIG. 2D, FIG. 3A through FIG. 3C, and/or FIG. 4. As illustrated in FIG. 5B, the coupled air amplifier array 512.2 is horizontally adjacent to the coupled air amplifier array 512.1 and the coupled air amplifier array 512.*a* is horizontally adjacent to the coupled air amplifier array 512.2. Although not illustrated in FIG. 5B, one or more of the coupled air amplifier arrays 512.1 through 512.*a* can be offset, for example, tilted, by a tilt angle in a substantially similar manner as the coupled air amplifier array 502.*a* as described above in FIG. 5A.

The configuration and arrangement of the coupled air amplifier arrays 512.1 through 512.*a* as illustrated in FIG. 5B allows the coupled air amplifier arrays 512.1 through 512.*a* to focus the high-velocity collective output streams of air 552.1 through 552.*a* toward different horizontal distances within a reference coordinate system, such as different x-coordinates of the Cartesian coordinate system to provide an example. In the exemplary embodiment illustrated in FIG. 5B, the coupled air amplifier array 512.1 focuses the high-velocity, high-volume collective output stream of air 552.1 toward a first x-coordinate of the Cartesian coordinate system. The coupled air amplifier array 512.2 focuses the high-velocity, high-volume collective output stream of air 552.2 toward a second x-coordinate of the Cartesian coordinate system that is greater than the first x-coordinate. The coupled air amplifier array 512.*a* focuses the high-velocity, high-volume collective output stream of air 552.*a* toward an $a^{th}$ x-coordinate of the Cartesian coordinate system that is greater than the second x-coordinate.

In the exemplary embodiment illustrated in FIG. 5B, the air amplifiers 514.1.1 through 514.*a*.2 can provide high-velocity collective output streams of air 552.1 through 552.*a* in substantially similar manner as described above in FIG. 1, FIG. 2A through FIG. 2D, FIG. 3A through FIG. 3C, and/or FIG. 4. In some embodiments, the air amplifiers 514.1.1 through 514.*a*.2 can be similar to one another and/or different from each other as illustrated in FIG. 5B. In the exemplary embodiment illustrated in FIG. 5B, the air amplifiers 514.1.1, 514.1.2, 514.2.1, and 514.2.2 can be characterized as being larger than the air amplifiers 514.*a*.1 and 514.*a*.2. In this exemplary embodiment, the high-velocity, high-volume collective output stream of air 552.1 and/or the high-velocity, high-volume collective output stream of air 552.2 can be characterized as having a larger spatial volume and/or a larger velocity over distance than the high-velocity, high-volume collective output stream of air 552.*a*.

Although not described above in FIG. 5A and FIG. 5B, those skilled in the relevant art(s) will recognize that other coupled air amplifier systems can be implemented to include one or more air amplifier arrays configured and arranged in along the vertical direction as described above in FIG. 5A and/or one or more air amplifier arrays configured and arranged in along the horizontal direction as described above in FIG. 5B in accordance with the teachings herein without departing from the spirit and scope of the present disclosure.

Exemplary Application for the Exemplary Coupled Air Amplifier Array Systems

Figure 6A:
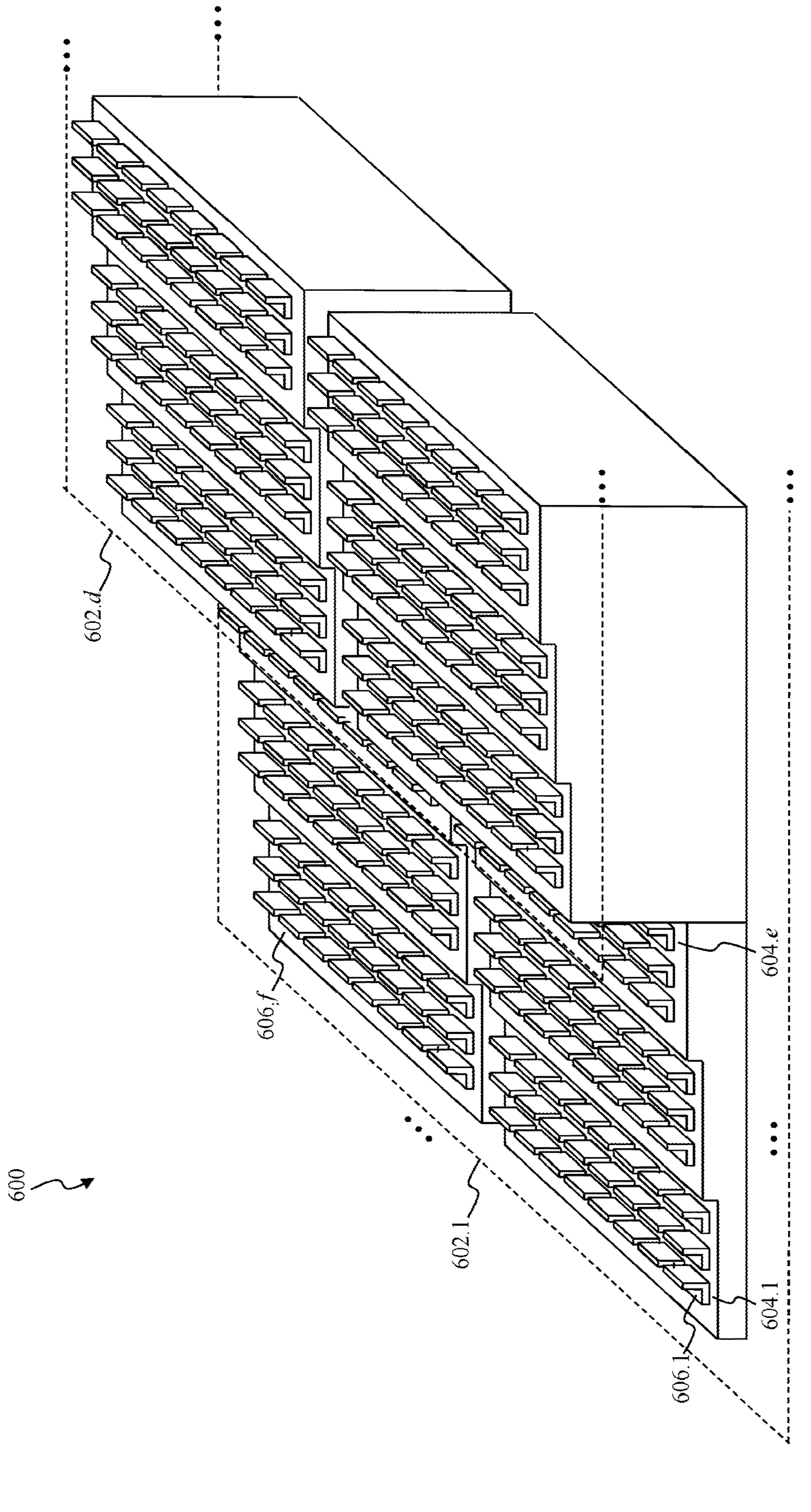
FIG. 6A through FIG. 6D illustrate pictorial representations of exemplary venues in accordance with some exemplary embodiments.

FIG. 6A through FIG. 6D illustrate pictorial representations of exemplary venues in accordance with some exemplary embodiments. In the exemplary embodiment illustrated in FIG. 6, a venue 600 represents a location for hosting an event. For example, the venue 600 can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. The event can represent a musical event, a theatrical event, a sporting event, a motion picture, and/or any other suitable event that will be apparent to those skilled in the relevant art(s) without departing the spirit and scope of the present disclosure. In the exemplary embodiment illustrated in FIG. 6, the venue 600 includes one or more seating sections 602.1 through 602.*d* to seat an audience to view the event. In some embodiments, the seating sections 602.1 through 602.*d* represent different seating sections at different heights for viewing the event. As illustrated in FIG. 6A, the seating section 602.1 represents a lower seating section for viewing the event and the seating section 602.*d* represents an upper seating section above the seating section 602.1 for viewing the event. The seating sections 602.1 through 602.*d* include rows of seats 604.1 through 604.*e* for seating the audience to view the event. In some embodiments, the rows of seats 604.1 through 604.*e* represent different rows of seats at different heights for viewing the event. As illustrated in FIG. 6A, the row of seats 604.1 represents a lower row of seats for viewing the event and row of seats 604.*e* represents an upper row of seats above the row of seats 604.1 for viewing the event. As illustrated in FIG. 6A, the rows of seats 604.1 through 604.*e* include seats 606.1 through 606.*f* for seating the audience to view the event. Although the discussion of FIG. 6A through FIG. 6D to follow is to be described in terms of the venue 600, those skilled in the relevant art(s) will recognize the teachings herein are similarly applicable to other venues having more or less seating sections, more or less rows of seats, and/or more or less seats without departing from the spirit and scope of the present disclosure.

Figure 6B:
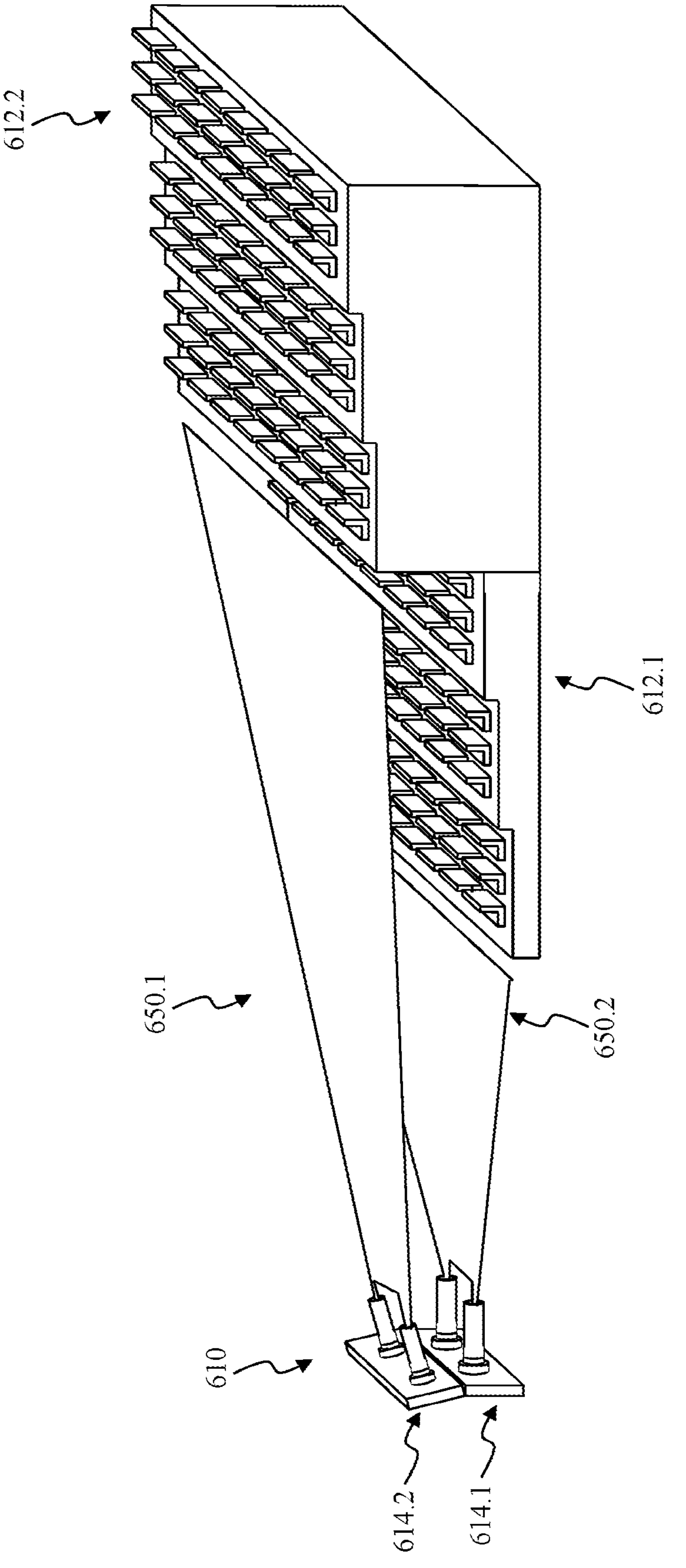

As illustrated in FIG. 6B, a coupled air amplifier system 610 can be situated within the venue 600 to provide the high-velocity, high-volume collective output stream of air 650.1 and the high-velocity, high-volume collective output stream of air 650.2 to the audience seated in seating section 612.1 and the section 612.2, respectively, to enhance the immersion of the audience seated in the seating section 612.1 and the section 612.2 in viewing the event. In the exemplary embodiment illustrated in FIG. 6A, the seating section 612.1 and the section 612.2 can be characterized as being situated vertically, for example, above, with respect to each other in the venue 600. In some embodiments, the coupled air amplifier system 610 can represent an exemplary embodiment of the coupled air amplifier system 500 as described above in FIG. 5A. In some embodiments, the seating section 612.1 and the section 612.2 can represent two seating sections from among the seating sections 602.1 through 602.*d* and/or portions thereof. In the exemplary embodiment illustrated in FIG. 6B, the coupled air amplifier system 610 includes a coupled air amplifier array 614.1 and a coupled air amplifier array 614.2. The coupled air amplifier array 614.1 and the coupled air amplifier array 614.2 can provide high-velocity collective output streams of air 650.1 and 650.2, respectively, in a substantially similar manner as described above in FIG. 1, FIG. 2A through FIG. 2D, FIG. 3A through FIG. 3C, FIG. 4, FIG. 5A, and/or FIG. 5B. As illustrated in FIG. 6B, the coupled air amplifier array 614.1 can focus the high-velocity, high-volume collective output stream of air 650.1 toward the seating section 612.1. Similarly, the coupled air amplifier array 614.2 can focus the high-velocity, high-volume collective output stream of air 650.2 toward the seating section 612.2 to the audience seated in seating section 612.2.

Figure 6C:
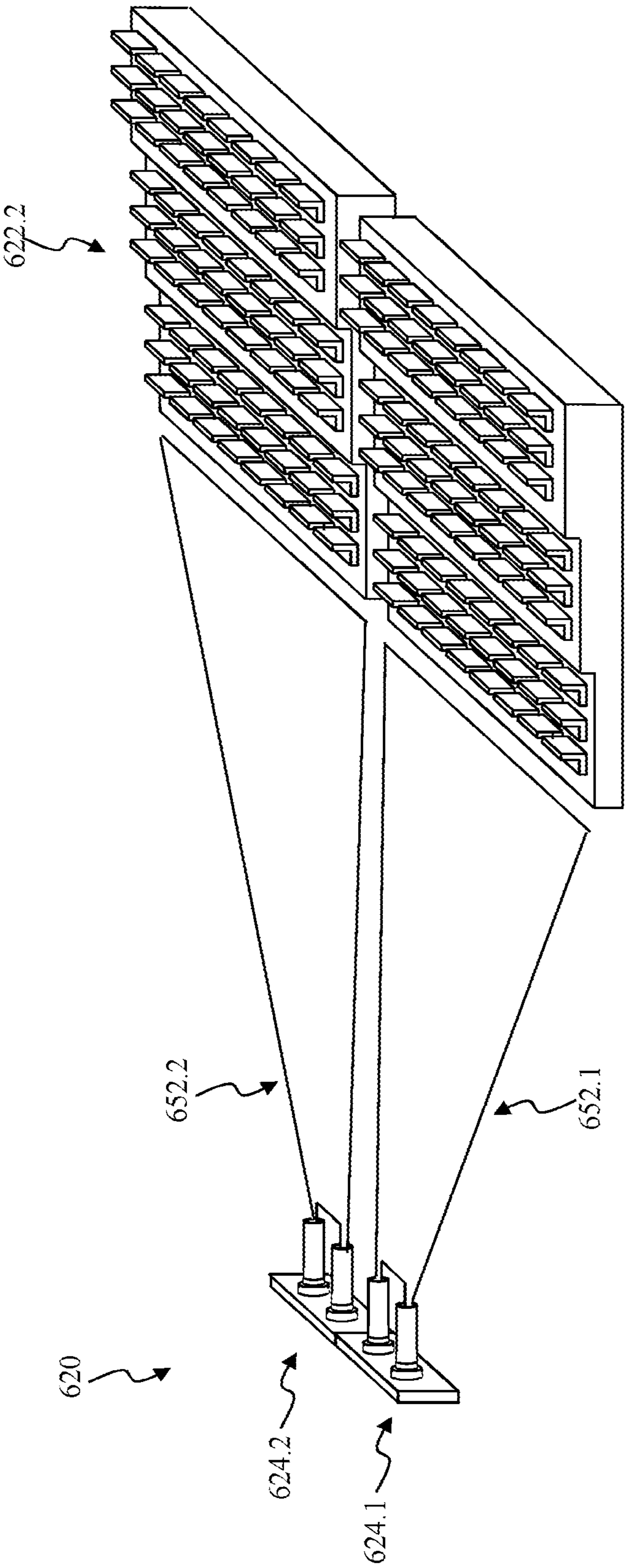

As illustrated in FIG. 6C, a coupled air amplifier system 620 can be situated within the venue 600 to provide a high-velocity, high-volume collective output stream of air 652.1 and a high-velocity, high-volume collective output stream of air 652.2 to the audience seated in a seating section 622.1 and a seating section 622.2, respectively, to enhance the immersion of the audience seated in the seating section 622.1 and the seating section 622.2 in viewing the event. In the exemplary embodiment illustrated in FIG. 6B, the seating section 622.1 and the section 622.2 can be characterized as being situated horizontally, for example, alongside, with respect to each other in the venue 600. In some embodiments, the coupled air amplifier system 620 can represent an exemplary embodiment of the coupled air amplifier system 510 as described above in FIG. 5B. In some embodiments, in the seating section 622.1 and the seating section 622.2 can represent one or more seating sections from among the seating sections 602.1 through 602.*d* and/or portions thereof.

In the exemplary embodiment illustrated in FIG. 6B, the coupled air amplifier system 620 includes a coupled air amplifier array 624.1 and a coupled air amplifier array 624.2. The coupled air amplifier array 624.1 and the coupled air amplifier array 624.2 can provide the high-velocity, high-volume collective output stream of air 652.1 and the high-velocity collective output streams 652.2, respectively, in a substantially similar manner as described above in FIG. 1, FIG. 2A through FIG. 2D, FIG. 3A through FIG. 3C, FIG. 4, FIG. 5A, and/or FIG. 5B. As illustrated in FIG. 6B, the coupled air amplifier array 624.1 can focus the high-velocity, high-volume collective output stream of air 652.1 toward the seating section 622.1. Similarly, the coupled air amplifier array 624.2 can focus the high-velocity, high-volume collective output stream of air 652.2 toward the seating section 622.2.

Figure 6D:
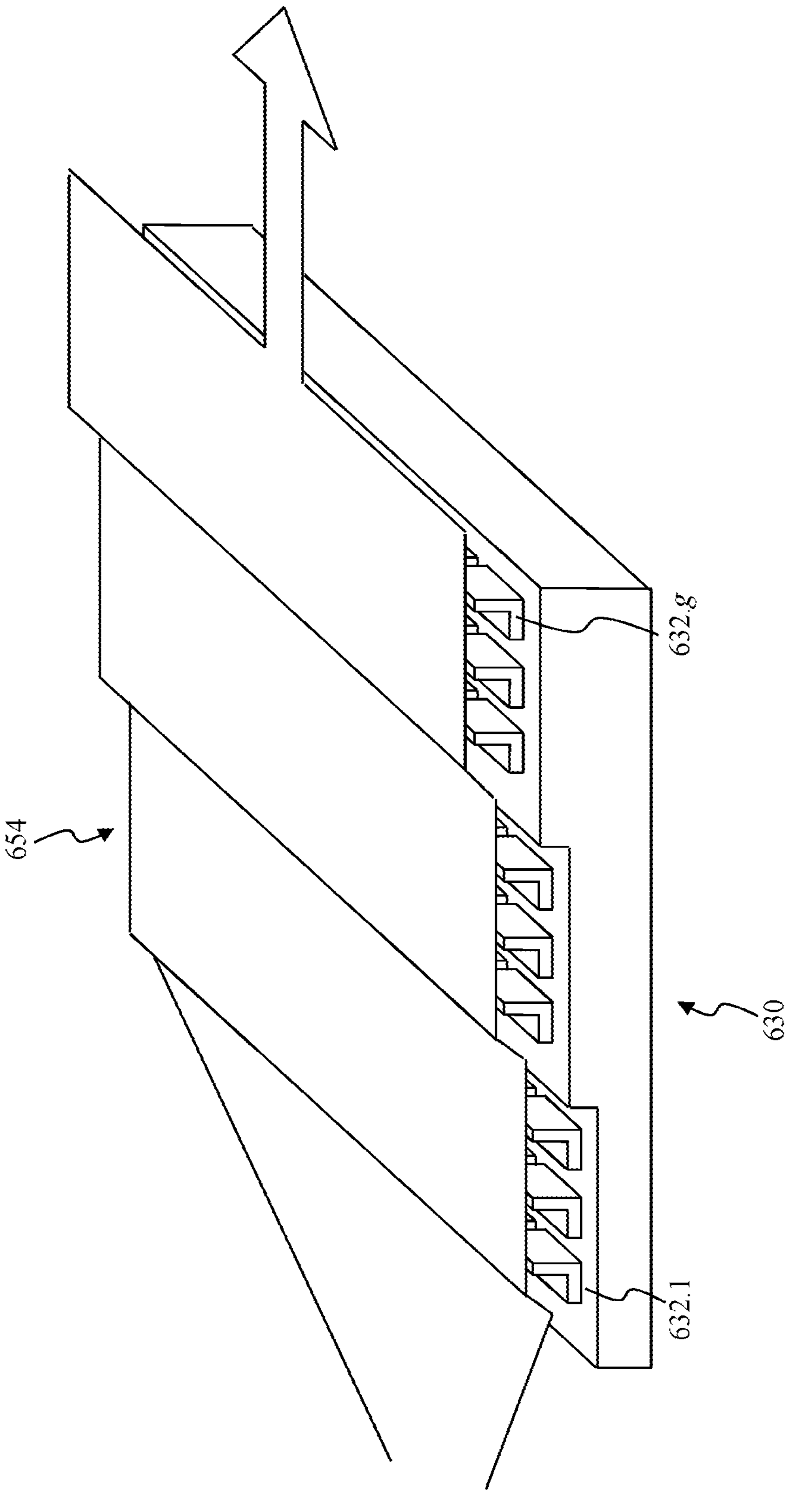

As illustrated in FIG. 6D, a high-velocity, high-volume collective output stream of air 654, such as the high-velocity, high-volume collective output stream of air 650.1, the high-velocity, high-volume collective output stream of air 650.2, the high-velocity, high-volume collective output stream of air 652.1, and/or the high-velocity, high-volume collective output stream of air 652.2 to provide some examples, is focused onto a seating section 630 having rows of seats 632.1 through 632.*g* as described above in FIG. 6B and FIG. 6C. In some embodiments, the seating section 630 can represent one seating section from among the seating sections 602.1 through 602.*d* and/or a portion thereof. In the exemplary embodiment illustrated in FIG. 6D, the high-velocity, high-volume collective output stream of air 654 propagates through the rows of seats 632.1 through 632.*g* to enhance the immersion of the audience seated in the rows of seats 632.1 through 632.*g* within the seating section 630. In some embodiments, the high-velocity, high-volume collective output stream of air 654 follows across contours of the seats, also referred to as a rake, of the rows of seats 632.1 through 632.*g* in accordance with the well-known Coandă effect to enhance the immersion of the audience seated in the rows of seats 632.1 through 632.*g* within the seating section 630.

Exemplary Atmospheric Effects Systems

The exemplary atmospheric effects systems, as to be described in further detail below, provide various atmospheric effects relating to the event and thereafter present these atmospheric effects to the audience to enhance the immersion of the audience as they are viewing the event. In some embodiments, these atmospheric effects can include an idle stream of air, a breeze stream of air, a blast stream of air, a cold stream of air, a cold breeze stream of air, a cold blast stream of air, a warm stream of air, a warm breeze stream of air, a warm blast stream of air, and/or a scented stream of air. In some embodiments, the idle stream of air can be characterized as being a stream of air having a slow speed, for example, less than 2 MPH, at a substantially similar temperature as the venue 600. In some embodiments, the breeze stream of air can be characterized as being a stream of air having a medium speed, for example, less between 2 MPH and 7 MPH, at a substantially similar temperature as the venue 600. In some embodiments, the blast stream of air can be characterized as being a stream of air having a high speed, for example, greater than 7 MPH, at a substantially similar temperature as the venue 600. In some embodiments, the cold stream of air can be characterized as being a stream of air having the slow speed at a colder temperature than the venue 600, for example, at least 4 degrees or more colder than the temperature as the venue 600. In some embodiments, the cold breeze of air can be characterized as being a stream of air having the medium speed at a colder temperature than the venue 600, for example, at least 4 degrees or more colder than the temperature as the venue 600. In some embodiments, the cold blast of air can be characterized as being a stream of air having the high speed at a colder temperature than the venue 600, for example, at least 4 degrees or more colder than the temperature as the venue 600. In some embodiments, the hot stream of air can be characterized as being a stream of air having the slow speed at a hotter temperature than the venue 600, for example, at least 4 degrees or more hotter than the temperature as the venue 600. In some embodiments, the hot breeze of air can be characterized as being a stream of air having the medium speed at a hotter temperature than the venue 600, for example, at least 4 degrees or more hotter than the temperature as the venue 600. In some embodiments, the hot blast of air can be characterized as being a stream of air having the high speed at a hotter temperature than the venue 600, for example, at least 4 degrees or more hotter than the temperature as the venue 600. In some embodiments, the scented stream of air can be characterized as being a stream of air having the idle stream of air, the breeze stream of air, the blast stream of air, the cold stream of air, the cold breeze stream of air, the cold blast stream of air, the warm stream of air, the warm breeze stream of air, and/or the warm blast stream of air that has been infused with one or more scents.

Figure 7A:
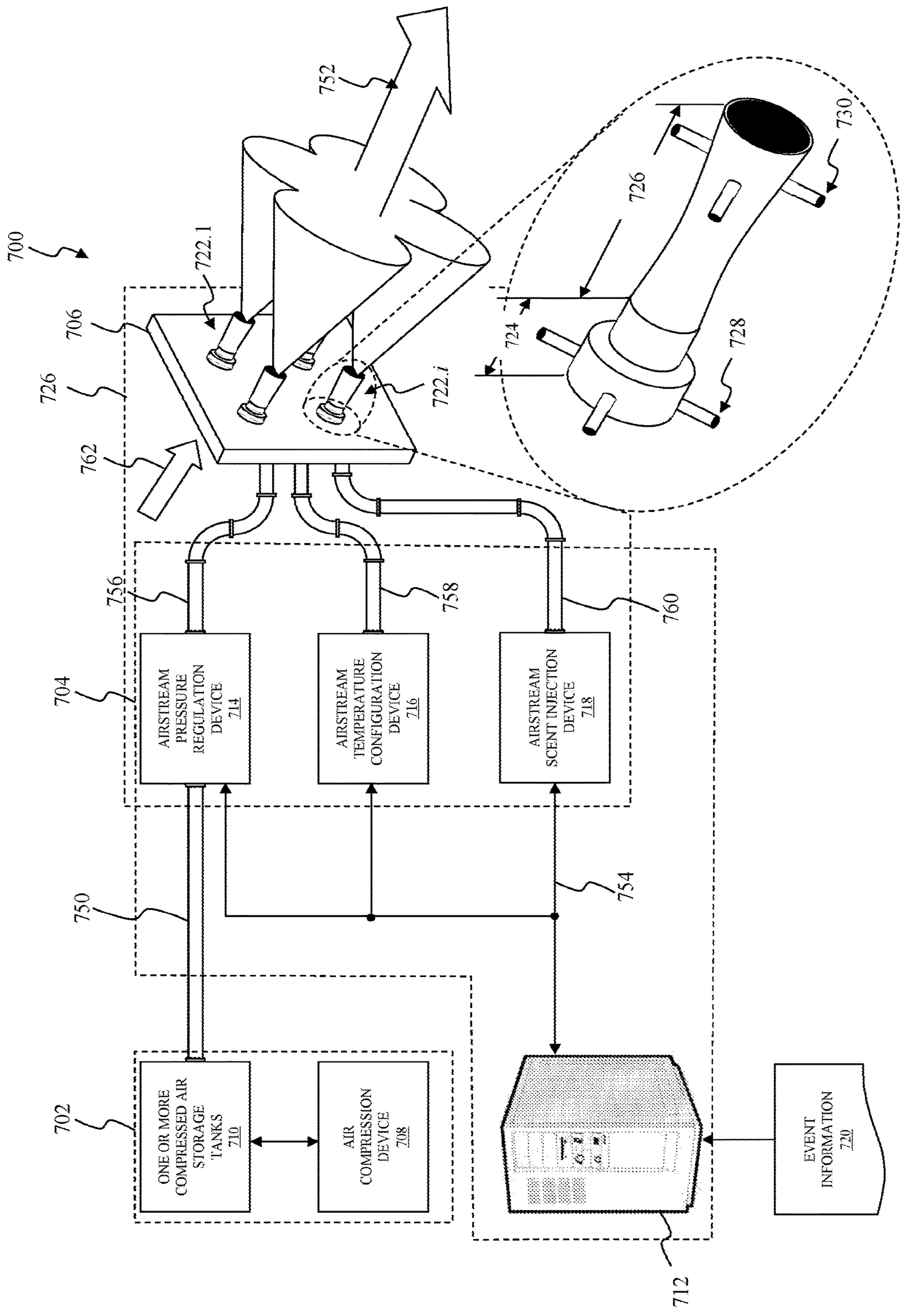
FIG. 7A illustrates a block diagram of a first exemplary atmospheric effects system in accordance with some exemplary embodiments.

FIG. 7A illustrates a block diagram of a first exemplary atmospheric effects system in accordance with some exemplary embodiments. In the exemplary embodiment illustrated in FIG. 7A, an atmospheric effects system 700 can provide various atmospheric effects relating to an event, such a musical event, a theatrical event, a sporting event, a motion picture, and/or any other suitable event that will be apparent to those skilled in the relevant art(s) without departing the spirit and scope of the present disclosure. In some embodiments, these atmospheric effects can include the idle stream of air, the breeze stream of air, the blast stream of air, the cold stream of air, the cold breeze stream of air, the cold blast stream of air, the warm stream of air, the warm breeze stream of air, the warm blast stream of air, the scented stream of air, and/or any combination thereof as described above. In some embodiments, the exemplary atmospheric effects system 700 can be situated within a venue, such as the venue 600 as described above in FIG. 6A, which hosts the event. In these embodiments, the exemplary atmospheric effects system 700 can present the atmospheric effects to an audience within the venue to enhance the immersion of the audience as they are viewing the event. In the exemplary embodiment illustrated in FIG. 7A, the atmospheric effects system 700 includes a compressed air system 702, an atmospheric effects control system 704, and a coupled air amplifier system 706.

The compressed air system 702 provides a high-pressure input stream of air 750. In some embodiments, the high-pressure input stream of air 750 can be characterized as having a pressure greater than an atmospheric pressure of the venue. In the exemplary embodiment illustrated in FIG. 7A, the compressed air system 702 includes an air compression device 708 and one or more compressed air storage tanks 710. In some embodiments, the air compression device 708 can include one or more electrical, one or more mechanical, and/or one or more electromechanical devices, also referred to as air compressors, which compress air ambient by forcing the ambient air into the one or more compressed air storage tanks 710 increase the pressure of air ambient within the one or more compressed air storage tanks 710. In these embodiments, the pressurized air, also referred to as the compressed air, within the one or more compressed air storage tanks 710 can be released from the one or more compressed air storage tanks 710 to provide the high-pressure input stream of air 750.

The atmospheric effects control system 704 controls the overall configuration and/or operation of the atmospheric effects system 700. In the exemplary embodiment illustrated in FIG. 7A, the atmospheric effects control system 704 includes an atmospheric effects computer system 712, an airstream pressure regulation device 714, an airstream temperature configuration device 716, and an airstream scent injection device 718. As illustrated in FIG. 7A, one or more connections between the compressed air system 702, the coupled air amplifier system 706, the airstream pressure regulation device 714, the airstream temperature configuration device 716, and the airstream scent injection device 718 can be implemented using conduits of metal, plastic, and/or any other suitable material that will be apparent to those skilled in the relevant art(s) without depart from the spirit and scope of the present disclosure that can be utilized to transport streams of air and/or fluids throughout the atmospheric effects system 700 as to be described in further detail below. In some embodiments, the conduits can be characterized as being flexible conduits, semi-rigid conduits, rigid conduits and/or any combination thereof. For example, the flexible conduits can be used to transport the high-pressure input stream of air 750 from the compressed air system 702 to the atmospheric effects control system 704.

In the exemplary embodiment illustrated in FIG. 7A, the atmospheric effects computer system 712 controls the overall configuration and/or operation of the atmospheric effects control system 704. As illustrated in FIG. 7A, the atmospheric effects computer system 712 can provide one or more control signals 754 to control the airstream pressure regulation device 714, the airstream temperature configuration device 716, and/or the airstream scent injection device 718 to introduce the one or more atmospheric effects into an atmospherically enhanced high-velocity, high-volume collective output stream of air 752 as outlined by event information 720. Generally, the event information 720 describes one or more characteristics, one or more parameters, and/or one or more attributes, such as velocities, temperatures, and/or scents to provide some examples, of various atmospheric effects, such as the idle stream of air, the breeze stream of air, the blast stream of air, the cold stream of air, the cold breeze stream of air, the cold blast stream of air, the warm stream of air, the warm breeze stream of air, the warm blast stream of air, the scented stream of air, and/or any combination thereof to provide some examples, in relation to the event which are to be presented to the audience as the event is being viewed by the audience. In some embodiments, the event can be characterized as including various characters, various plots, various conflicts, various resolutions, various structures, various scenes, various dialogues, and/or various visuals. In these embodiments, the event information 720 can describe various atmospheric effects to be presented to the audience as the audience is viewing these characters, plots, conflicts, resolutions, structures, scenes, dialogues, and/or visuals. For example, the event information 720 can indicate the atmospheric effects system 700 is to provide a cold blast stream of air as the atmospherically enhanced high-velocity, high-volume collective output stream of air 752 during a blizzard scene from the event. In this example, the atmospheric effects system 700 provides the cold blast stream of air as the atmospherically enhanced high-velocity, high-volume collective output stream of air 752 and thereafter presents the atmospherically enhanced high-velocity, high-volume collective output stream of air 752 that reaches the audience as the audience is viewing the blizzard scene. As another example, the event information 720 can indicate the atmospheric effects system 700 is to provide the blast stream of air as the atmospherically enhanced high-velocity, high-volume collective output stream of air 752 during a hurricane scene from the event. In this example, the atmospheric effects system 700 provides the blast stream of air as the atmospherically enhanced high-velocity, high-volume collective output stream of air 752 and thereafter presents the atmospherically enhanced high-velocity, high-volume collective output stream of air 752 that reaches the audience as the audience is viewing the hurricane scene. In some embodiments, the event information 720 can be embedded within the event, for example, metadata describing the atmospheric effects to be provided and presented by the atmospheric effects system 700 embedded within the event. In some embodiments, the event information 720 can be entered into the atmospheric effects computer system 712 by a user operating a peripheral device, such as a keyboard or mouse to provide some examples, as the user is viewing the event. In some embodiments, the event information 720 can include a pre-determined script of atmospheric effects related to the event to be presented to the audience as the audience is viewing the event.

In the exemplary embodiment illustrated in FIG. 7A, the airstream pressure regulation device 714 can selectively to control, for example, regulate, the velocity, the pressure, and/or the volume of the high-pressure input stream of air 750 to provide a pressure regulated input stream of air 756 to the coupled air amplifier system 706 in response to the one or more control signals 754. The airstream pressure regulation device 714 can include one or more electrical, one or more mechanical, and/or one or more electromechanical devices to control the velocity, the pressure, and/or the volume of the high-pressure input stream of air 750. In some embodiments, these one or more electrical, one or more mechanical, and/or one or more electromechanical devices can include one or more electronic controlled pressure reducing regulators and/or one or more electronic controlled pressure sustaining regulators. In the exemplary embodiment illustrated in FIG. 7A, the velocity, the pressure, and/or the volume of the atmospherically enhanced high-velocity, high-volume collective output stream of air 752 can be related to at least the pressure of the pressure regulated input stream of air 756. In some embodiments, a larger pressure for the pressure regulated input stream of air 756 can be used by the coupled air amplifier system 706 to provide the atmospherically enhanced high-velocity, high-volume collective output stream of air 752 having a greater velocity, pressure, and/or volume as compared to a smaller pressure for the pressure regulated input stream of air 756. In the exemplary embodiment illustrated in FIG. 7A, the high-pressure input stream of air 750 can be characterized as being at a constant pressure, for example, between two (2) pounds per square inch (PSI) and two-hundred (200) PSI. In these embodiments, the airstream pressure regulation device 714 can control, for example, decrease, this constant pressure of the high-pressure input stream of air 750 to provide the pressure regulated input stream of air 756. As an example, the airstream pressure regulation device 714 can lower the constant pressure of the high-pressure input stream of air 750 to be at a first pressure, for example, a minimum pressure, to cause the coupled air amplifier system 706 to provide the idle stream of air as the atmospherically enhanced high-velocity, high-volume collective output stream of air 752. In this example, the airstream pressure regulation device 714 can lower the constant pressure of the high-pressure input stream of air 750 to be at a second pressure, for example, a medium pressure, which is greater than the first pressure to provide the breeze stream of air as the atmospherically enhanced high-velocity, high-volume collective output stream of air 752. In this example, the airstream pressure regulation device 714 can pass through and/or lower the constant pressure of the high-pressure input stream of air 750 to be at a third pressure, for example, a maximum pressure, which is greater than the second pressure to cause the coupled air amplifier system 706 to provide the blast stream of air as the atmospherically enhanced high-velocity, high-volume collective output stream of air 752. In some embodiments, the airstream pressure regulation device 714 can decouple the high-pressure input stream of air 750 from the coupled air amplifier system 706 to deactivate the coupled air amplifier system 706. In these embodiments, the airstream pressure regulation device 714 can include an electronic controlled value, which can be closed, to decouple the high-pressure input stream of air 750 the airstream pressure regulation device 714.

In the exemplary embodiment illustrated in FIG. 7A, the airstream temperature configuration device 716 can utilize the one or more control signals 754 to selectively control the temperature of the atmospherically enhanced high-velocity, high-volume collective output stream of air 752 in response to the one or more control signals 754. As illustrated in FIG. 7A, the airstream temperature configuration device 716 can provide a thermal stream of air 758 to the coupled air amplifier system 706. In some embodiments, the thermal stream of air 758 can be characterized as having a hotter temperature, for example, approximately one hundred (100) degrees Celsius (C), that is hotter than a temperature of a venue or a colder temperature, for example, approximately zero (0) degrees C., that is colder than the temperature of the venue. In an exemplary embodiment, the airstream temperature configuration device 716 can be coupled to one or more steam generators, also referred to as boilers, which provide steam by applying heat energy to water. In this exemplary embodiment, the airstream temperature configuration device 716 can provide this stream as the thermal stream of air 758 to cause the atmospherically enhanced high-velocity, high-volume collective output stream of air 752 to be at the hotter temperature that is hotter than a temperature of a venue. In the exemplary embodiment illustrated in FIG. 7A, the temperature of the atmospherically enhanced high-velocity, high-volume collective output stream of air 752 can be related to at least the temperature of the thermal stream of air 758. In some embodiments, a hotter temperature for the thermal stream of air 758 can be used by the coupled air amplifier system 706 to provide the atmospherically enhanced high-velocity, high-volume collective output stream of air 752 having a hotter temperature as compared to a colder temperature for the thermal stream of air 758.

In the exemplary embodiment illustrated in FIG. 7A, the airstream scent injection device 718 can selectively provide one or more scented fluids 760 having one or more scents to the coupled air amplifier system 706 in response to the one or more control signals 754. In some embodiments, the one or more scented fluids 760 can include one or more aroma compounds. These aroma compounds can include various esters, such as geranyl acetate having a floral or fruity rose aroma; various terpenes, such as citral having a lemon aroma and/or carvone having a caraway or spearmint aroma; amine compounds, such as trimethylamine having a fishy aroma; various aldehydes; such as hexanal having a grassy aroma or isovaleraldehyde having a cocoa aroma; various thiols, such as benzyl mercaptan having a garlic aroma; various lactones, such as gamma-nonalactone having a coconut aroma or gamma-decalactone having a cocoa peach aroma; various ketones, such as 6-acetyl-2,3,4,5-tetrahydropyridine having a fresh bread aroma; various aromatics such as cinnamaldehyde having a cinnamon aroma or benzaldehyde having an almond aroma; and/or any suitable chemical compound that can be characterized as having a smell or odor that will be apparent to those skilled in the relevant art(s) without departing from the spirit and scope of the present disclosure. In some embodiments, the airstream scent injection device 718 can store multiple scented fluids. In these embodiments, the airstream scent injection device 718 can utilize the one or more control signals 754 to select one or more scented fluids from among these multiple scented fluids and thereafter provide these selected scented fluids as the one or more scented fluids 760.

In some embodiments, the airstream pressure regulation device 714, the airstream temperature configuration device 716, and/or the airstream scent injection device 718 can provide the one or more control signals 754 which can be utilized by the atmospheric effects computer system 712 to monitor the high-pressure input stream of air 750, the pressure regulated input stream of air 756, the thermal stream of air 758, and/or the one or more scented fluids 760. For example, the airstream pressure regulation device 714 can monitor the pressure of the pressure regulated input stream of air 756 and can thereafter provide the pressure of the pressure regulated input stream of air 756 to the atmospheric effects computer system 712. As another example, the airstream temperature configuration device 716 can monitor the pressure and/or the temperature of the thermal stream of air 758 and can thereafter provide the pressure and/or the temperature of the thermal stream of air 758 to the atmospheric effects computer system 712.

In the exemplary embodiment illustrated in FIG. 7A, the coupled air amplifier system 706 can provide the atmospherically enhanced high-velocity, high-volume collective output stream of air 752 having the atmospheric effects. As described above, these atmospheric effects can include the idle stream of air, the breeze stream of air, the blast stream of air, the cold stream of air, the cold breeze stream of air, the cold blast stream of air, the warm stream of air, the warm breeze stream of air, the warm blast stream of air, the scented stream of air, and/or any combination thereof. In some embodiments, the coupled air amplifier system 706 can utilize the pressure regulated input stream of air 756 to provide the idle stream of air, the breeze stream of air, and/or the blast stream of air as the atmospherically enhanced high-velocity, high-volume collective output stream of air 752 in a substantially similar manner as described above in FIG. 1, FIG. 2A through FIG. 2D, FIG. 3A through FIG. 3C, FIG. 4, FIG. 5A, and/or FIG. 5B. Moreover, the coupled air amplifier system 706 can introduce the thermal stream of air 758 and/or the one or more scented fluids 760 into the idle stream of air, the breeze stream of air, and/or the blast stream of air to provide the cold stream of air, the cold breeze stream of air, the cold blast stream of air, the warm stream of air, the warm breeze stream of air, the warm blast stream of air, the scented stream of air, and/or any combination thereof as the atmospherically enhanced high-velocity, high-volume collective output stream of air 752.

In the exemplary embodiment illustrated in FIG. 7A, the coupled air amplifier system 706 includes the air amplifiers 722.1 through 722.*i*. In some embodiments, the air amplifiers 722.1 through 722.*i* can be configured and arranged in a substantially similar manner as described above in FIG. 1, FIG. 2A through FIG. 2D, FIG. 3A through FIG. 3C, FIG. 4, FIG. 5A, and/or FIG. 5B. As illustrated in FIG. 7A, each of the air amplifiers 722.1 through 722.*i* includes an air amplification engine 724 having one or more nozzles 728 and an air guide 726 having one or more nozzles 730 to control the direction or characteristics of the pressure regulated input stream of air 756, the thermal stream of air 758, and/or the one or more scented fluids 760. As illustrated in FIG. 7A, the one or more nozzles 728 are situated around a peripheral circumference of an amplification engine 724 and the one or more nozzles 730 are situated around a peripheral circumference of the air guide 726. However, this configuration and arrangement of the one or more nozzles 728 and the one or more nozzles 730 is for exemplary purposes only. Those skilled in the relevant art(s) will recognize the teachings herein are similarly applicable to other configurations and arrangements of the one or more nozzles 728 and the one or more nozzles 730 without departing from the spirit and scope of the present disclosure. For example, those skilled in the relevant art(s) will recognize that the number of nozzles within the one or more nozzles 728 and the one or more nozzles 730, as well as their positioning, can be different than illustrated in FIG. 7A without departing from the spirit and scope of the present disclosure.

In some embodiments, the one or more nozzles 728 can introduce the pressure regulated input stream of air 756 into the air amplification engine 724. The air amplification engine 724 shares many similar features as the air amplification engine 106 as described above in FIG. 1; therefore, only differences between the air amplification engine 106 and the air amplification engine 724 are to be described in further detail below. The one or more nozzles 728 can be implemented using gas jets, fluid jets, hydro jets, shaping nozzles, and/or high velocity nozzles to provide some examples, which can control the direction or characteristics of the pressure regulated input stream of air 756 as it enters the air amplification engine 724. Thereafter, the air amplification engine 724 utilizes energy from the pressure regulated input stream of air 756 to accelerate a low-velocity input stream of ambient air 762 to provide the atmospherically enhanced high-velocity, high-volume collective output stream of air 752 in a substantially similar manner as described above in FIG. 1, FIG. 2A through FIG. 2D, FIG. 3A through FIG. 3C, FIG. 4, FIG. 5A, and/or FIG. 5B to provide the idle stream of air, the breeze stream of air, and/or the blast stream of air as the atmospherically enhanced high-velocity, high-volume collective output stream of air 752.

In some embodiments, the one or more nozzles 728 can introduce the thermal stream of air 758 into the air amplification engine 724. Alternatively, or in addition to, the thermal stream of air 758 can be introduced into the pressure regulated input stream of air 756. In these embodiments, the thermal stream of air 758 can increase the temperature within the air amplification engine 724 to increase the temperature of the idle stream of air, the breeze stream of air, and/or the blast stream of air to provide the warm stream of air, the warm breeze stream of air, and/or the warm blast stream of air as the atmospherically enhanced high-velocity, high-volume collective output stream of air 752. Alternatively, or in addition to, the thermal stream of air 758 can decrease the temperature within the air amplification engine 724 to decrease the temperature of the idle stream of air, the breeze stream of air, and/or the blast stream of air to provide the cold stream of air, the cold breeze stream of air, and/or the cold blast stream of air as the atmospherically enhanced high-velocity, high-volume collective output stream of air 752. In some embodiments, the amplification engine 724 can generate the cold stream of air, the cold breeze stream of air, and/or the cold blast stream of air by providing the idle stream of air, the breeze stream of air, and/or the blast stream of air as the atmospherically enhanced high-velocity, high-volume collective output stream of air 752 and thereafter relying on the wind-chill effect caused by the idle stream of air, the breeze stream of air, and/or the blast stream of air as the idle stream of air, the breeze stream of air, and/or the blast stream of air is propagating throughout the venue.

In some embodiments, the one or more nozzles 730 can introduce the one or more scented fluids 760 into the air guide 726. The air guide 726 shares many similar features as the air guide 108 as described above in FIG. 1; therefore, only differences between the air guide 108 and the air guide 726 are to be described in further detail below. The one or more nozzles 730 can be implemented using single-fluid spray nozzles, such as plain-orifice nozzles, shaped-orifice nozzles, surface-impingement single-fluid nozzles, pressure-swirl single-fluid spray nozzles, solid-cone single-fluid nozzles, and/or compound nozzles to provide some examples, and/or two-fluid nozzles, such as internal-mix two-fluid nozzles and/or external-mix two-fluid nozzles to provide some examples, which can separate the one or more scented fluids 760 into smaller droplets. In these embodiments, the one or more scented fluids 760 can be dispersed by the idle stream of air, the breeze stream of air, the blast stream of air, the warm stream of air, the warm breeze stream of air, the warm blast stream of air, the cold stream of air, the cold breeze stream of air, and/or the cold blast stream of air to provide the scented stream of air as the atmospherically enhanced high-velocity, high-volume collective output stream of air 752.

In some embodiments, the coupled air amplifier system 706, the airstream pressure regulation device 714, the airstream temperature configuration device 716, and the airstream scent injection device 718 can be housed within a portable mechanical enclosure to form a portable mobile effects pod 726. The portable mobile effects pod 726 can be situated within a venue, such as the venue 600 to provide an example, and easily relocated within the venue. In some embodiments, the portable mobile effects pod 726 can be coupled to the compressed air system 702 using the flexible conduits to transport the high-pressure input stream of air 750 from the compressed air system 702 to the portable mobile effects pod 726. In some embodiments, the atmospheric effects computer system 712 and the portable mobile effects pod 726 can be communicatively coupled to each other using one or more networking cables, such as category 5 (Cat 5) cables to provide an example.

Figure 7B:
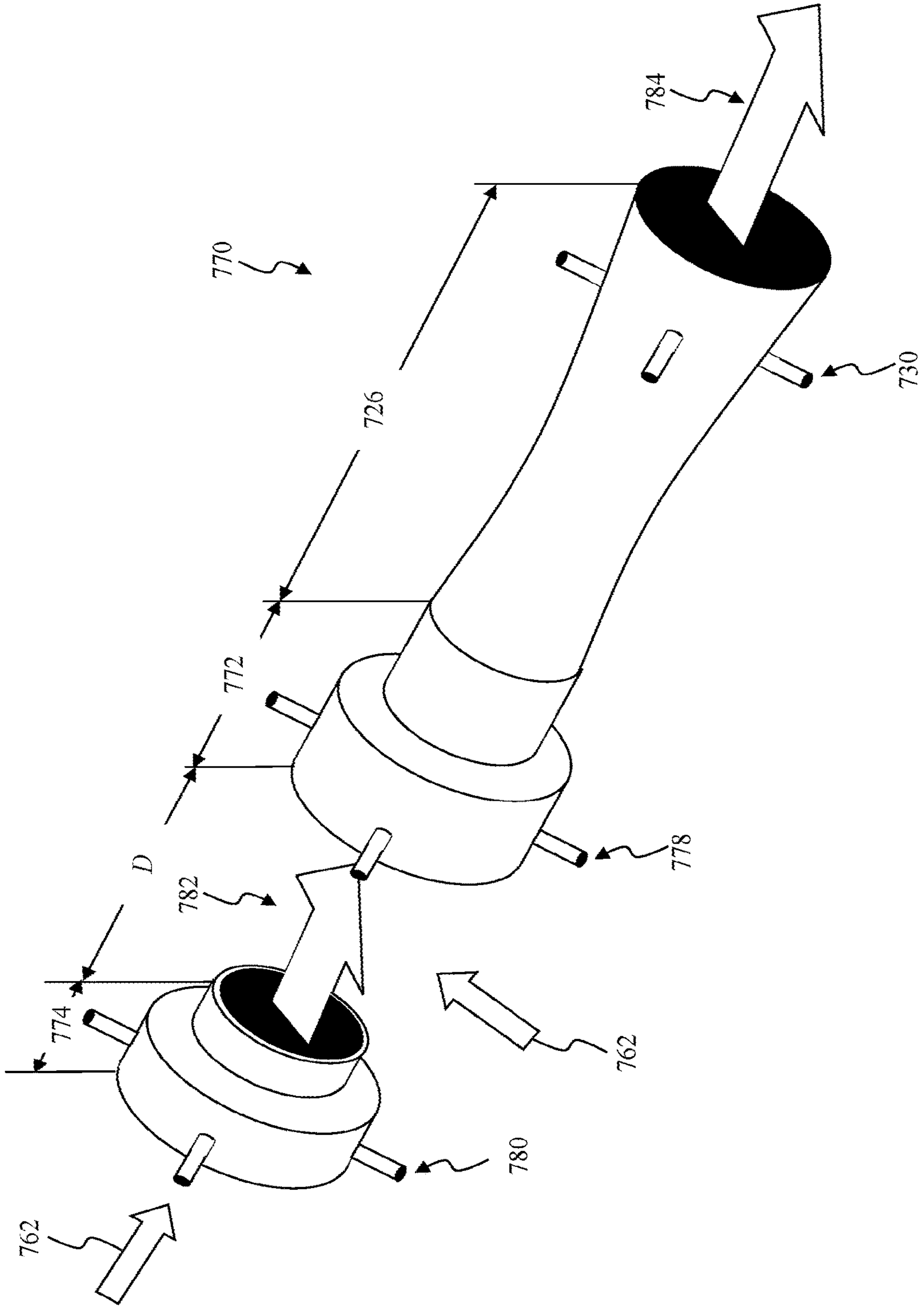
FIG. 7B illustrates a block diagram of an alternative air amplifiers that be utilized within the first exemplary atmospheric effects system in accordance with some exemplary embodiments.

FIG. 7B illustrates a block diagram of an alternative air amplifiers that be utilized within the first exemplary atmospheric effects system in accordance with some exemplary embodiments. In the exemplary embodiment illustrated in FIG. 7B, an air amplifier 770 represents a stacked air amplifier including the air guide 726 having the one or more nozzles 730 as described above in FIG. 7A. a primary air amplification engine 772 having one or more nozzles 778, a secondary amplification engine 774 having one or more nozzles 780. As illustrated in FIG. 7B, the one or more nozzles 778 are situated around a peripheral circumference of the primary air amplification engine 772 and the one or more nozzles 780 are situated around a peripheral circumference of the secondary amplification engine 774. However, this configuration and arrangement of the one or more nozzles 778 and the one or more nozzles 780 is for exemplary purposes only. Those skilled in the relevant art(s) will recognize the teachings herein are similarly applicable to other configurations and arrangements of the one or more nozzles 778 and the one or more nozzles 780 without departing from the spirit and scope of the present disclosure. For example, those skilled in the relevant art(s) will recognize that the number of nozzles within the one or more nozzles 778 and the one or more nozzles 780, as well as their positioning, can be different than illustrated in FIG. 7A without departing from the spirit and scope of the present disclosure.

In some embodiments, the one or more nozzles 780 can introduce the thermal stream of air 758 into the secondary amplification engine 774. The secondary amplification engine 774 shares many similar features as the air amplification engine 106 as described above in FIG. 1; therefore, only differences between the air amplification engine 106 and the secondary amplification engine 774 are to be described in further detail below. The one or more nozzles 780 can be implemented using gas jets, fluid jets, hydro jets, shaping nozzles, and/or high velocity nozzles to provide some examples, which can control the direction or characteristics of the thermal stream of air 758 as it enters the secondary amplification engine 774, In these embodiments, the thermal stream of air 758 can increase the temperature within the secondary amplification engine 774 or decrease the temperature within the secondary amplification engine 774. Thereafter, the secondary amplification engine 774 utilizes energy from the thermal stream of air 758 to accelerate the low-velocity input stream of ambient air 762 to provide an atmospherically enhanced high-velocity, high-volume collective output stream of air 782 in a substantially similar manner as described above in FIG. 1, FIG. 2A through FIG. 2D, FIG. 3A through FIG. 3C, FIG. 4, FIG. 5A, and/or FIG. 5B to provide a warm idle stream of air and/or a cold idle stream of air.

In some embodiments, the one or more nozzles 778 can introduce the pressure regulated input stream of air 756 into the primary air amplification engine 772. The air amplification engine 724 shares many similar features as the air amplification engine 106 as described above in FIG. 1; therefore, only differences between the air amplification engine 106 and the air amplification engine 724 are to be described in further detail below. The one or more nozzles 778 can be implemented using gas jets, fluid jets, hydro jets, shaping nozzles, and/or high velocity nozzles to provide some examples, which can control the direction or characteristics of the pressure regulated input stream of air 756 as it enters the primary air amplification engine 772. Thereafter, the primary air amplification engine 772 utilizes energy from the pressure regulated input stream of air 756 to accelerate the atmospherically enhanced high-velocity, high-volume collective output stream of air 782 and/or the low-velocity input stream of ambient air 762 to provide the atmospherically enhanced high-velocity, high-volume collective output stream of air 784 in a substantially similar manner as described above in FIG. 1, FIG. 2A through FIG. 2D, FIG. 3A through FIG. 3C, FIG. 4, FIG. 5A, and/or FIG. 5B to provide the warm stream of air, the warm breeze stream of air, and/or the warm blast stream of air, the cold stream of air, the cold breeze stream of air, and/or the cold blast stream of air.

In the exemplary embodiment illustrated in FIG. 7B, the primary air amplification engine 772 and the secondary amplification engine 774 are independently controllable. As illustrated in FIG. 7B, the primary air amplification engine 772 and the secondary amplification engine 774 can be activated to provide the warm stream of air, the warm breeze stream of air, and/or the warm blast stream of air, the cold stream of air, the cold breeze stream of air, and/or the cold blast stream of air. Additionally, the primary air amplification engine 772 can be activated and the secondary amplification engine 774 can be deactivated to provide the idle stream of air, the breeze stream of air, and/or the blast stream of air. As illustrated in FIG. 7B, the primary air amplification engine 772 and the secondary amplification engine 774 are separated by an entrainment distance D. In some embodiments, the entrainment distance D is selectively chosen such that there is sufficient separation, for example, approximately 3 inches, between the primary air amplification engine 772 and the secondary amplification engine 774 to allow the primary air amplification engine 772 to utilize energy from the pressure regulated input stream of air 756 to accelerate the low-velocity input stream of ambient air 762 when the secondary amplification engine 774 is deactivated to provide the idle stream of air, the breeze stream of air, and/or the blast stream of air as the atmospherically enhanced high-velocity, high-volume collective output stream of air 784. In some embodiments, the primary air amplification engine 772 can be activated and the secondary amplification engine 774 can be deactivated to provide the cold stream of air, the cold breeze stream of air, and/or the cold blast stream of air by providing the idle stream of air, the breeze stream of air, and/or the blast stream of air as the atmospherically enhanced high-velocity, high-volume collective output stream of air 784 and thereafter relying on the wind-chill effect caused by the idle stream of air, the breeze stream of air, and/or the blast stream of air as the idle stream of air, the breeze stream of air, and/or the blast stream of air is propagating throughout the venue.

Figure 8:
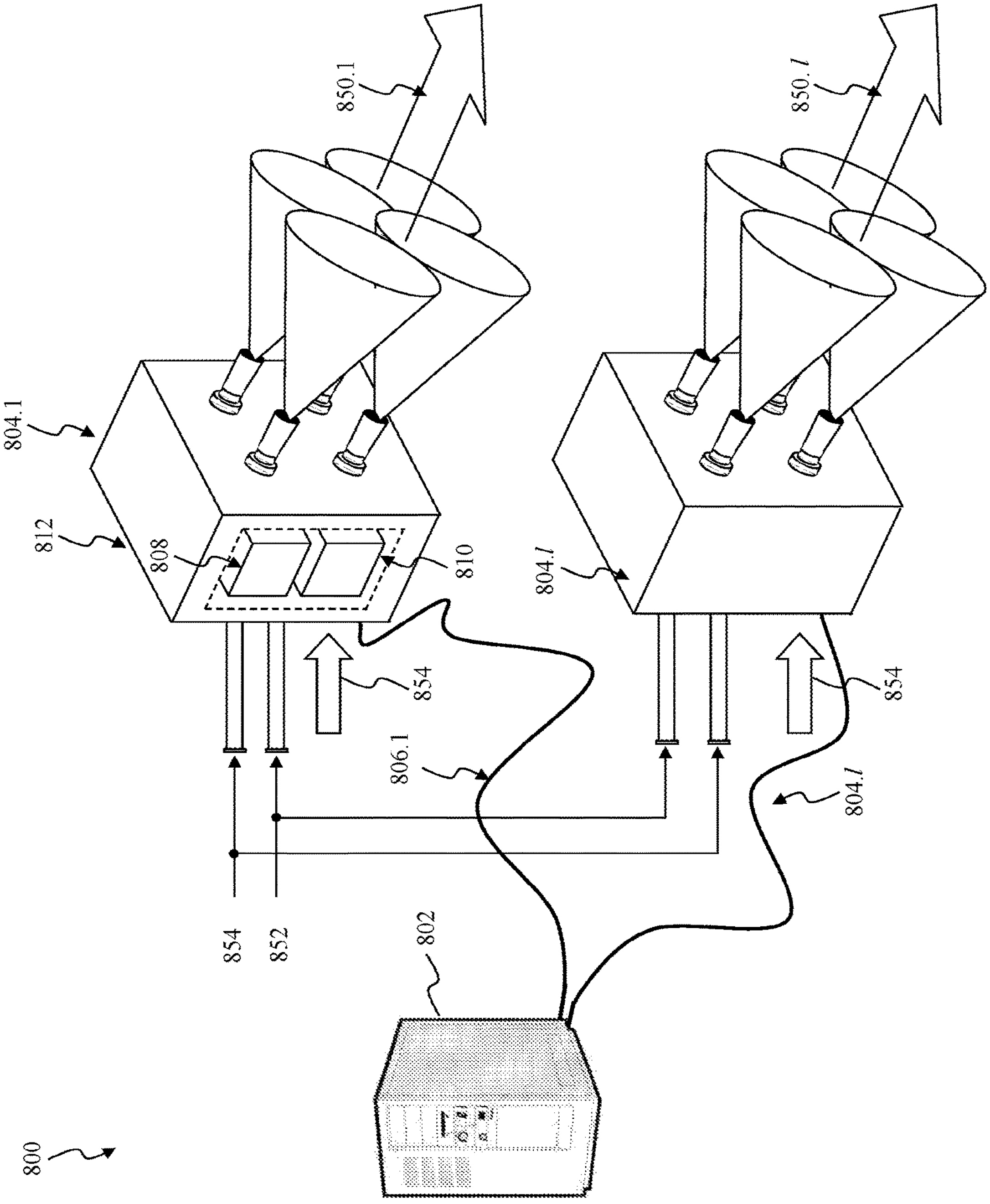
FIG. 8 illustrates a block diagram of a second exemplary atmospheric effects system in accordance with some exemplary embodiments.

FIG. 8 illustrates a block diagram of a second exemplary atmospheric effects system in accordance with some exemplary embodiments. In the exemplary embodiment illustrated in FIG. 8, an atmospheric effects system 800 can provide various atmospheric effects relating to an event, such a musical event, a theatrical event, a sporting event, a motion picture, and/or any other suitable event that will be apparent to those skilled in the relevant art(s) without departing the spirit and scope of the present disclosure. In some embodiments, these atmospheric effects can include the idle stream of air, the breeze stream of air, the blast stream of air, the cold stream of air, the cold breeze stream of air, the cold blast stream of air, the warm stream of air, the warm breeze stream of air, the warm blast stream of air, the scented stream of air, and/or any combination thereof as described above. In some embodiments, the exemplary atmospheric effects system 800 can be situated within a venue, such as the venue 600 as described above in FIG. 6A, which hosts the event. In these embodiments, the exemplary atmospheric effects system 800 can present the atmospheric effects to an audience within the venue to enhance the immersion of the audience as they are viewing the event. In the exemplary embodiment illustrated in FIG. 8, the atmospheric effects system 800 includes an atmospheric effects computer system 802 and portable mobile effects pods 804.1 through 804.*l*.

The atmospheric effects computer system 802 controls the overall configuration and/or operation of the portable mobile effects pods 804.1 through 804.*l* in a substantially similar manner as the atmospheric effects computer system 712 as described above in FIG. 7A and FIG. 7B. In the exemplary embodiment illustrated in FIG. 8, the atmospheric effects computer system 802 and the portable mobile effects pods 804.1 through 804.*l* can be communicatively coupled to one another using networking cables 806.1 through 806.*l*, such as category 5 (Cat 5) cables to provide an example. In the exemplary embodiment illustrated in FIG. 8, the networking cables 806.1 through 806.*l* can transport one or more control signals, such as the one or more control signals 754 as described above in FIG. 7A and FIG. 7B to provide an example, between the atmospheric effects computer system 802 and the portable mobile effects pods 804.1 through 804.*l* to control operation of the portable mobile effects pods 804.1 through 804.*l* in a substantially similar manner as described above in FIG. 7A and FIG. 7B.

In the exemplary embodiment illustrated in FIG. 8, the portable mobile effects pods 804.1 through 804.*l* provide atmospherically enhanced high-velocity collective output streams of air 850.1 through 850.*l* in a substantially similar manner as described above in FIG. 7A and FIG. 7B. In some embodiments, the portable mobile effects pods 804.1 through 804.*l* can represent exemplary embodiments of the portable mobile effects pod 726 as illustrated in FIG. 7A and FIG. 7B. As illustrated in FIG. 8, the portable mobile effects pods 804.1 through 804.*l* can receive a high-pressure input stream of air 852. In some embodiments, the high-pressure input stream of air 852 can be received from a compressed air system, such as the compressed air system 702 to provide an example, situated within a venue, such as the venue 600 to provide an example. In the exemplary embodiment illustrated in FIG. 8, the portable mobile effects pods 804.1 through 804.*l* can utilize the high-pressure input stream of air 852 to provide the idle stream of air, the breeze stream of air, the blast stream of air as the atmospherically enhanced high-velocity collective output streams of air 850.1 through 850.*l* in a substantially similar manner as described above in FIG. 7A and FIG. 7B. In some embodiments, the portable mobile effects pods 804.1 through 804.*l* can additionally receive a high-temperature stream of air 854, such as steam to provide an example. In some embodiments, the high-temperature stream of air 854 can be received from one or more steam generators, also referred to as boilers, situated within the venue. In the exemplary embodiment illustrated in FIG. 8, the portable mobile effects pods 804.1 through 804.*l* can include one or more high-temperature stream of air storage tanks 808 situated within a mechanical enclosure 812 for storing the high-temperature stream of air 854. In some embodiments, the portable mobile effects pods 804.1 through 804.*l* can release the high-temperature stream of air 854 from the one or more high-temperature stream of air storage tanks 808 and thereafter utilize this release high-temperature stream of air 854 to provide the warm stream of air, the warm breeze stream of air, and/or the warm blast stream of air as the atmospherically enhanced high-velocity collective output streams of air 850.1 through 850.*l* in a substantially similar manner as described above in FIG. 7A and FIG. 7B. Moreover, the portable mobile effects pods 804.1 through 804.*l* can provide the cold stream of air, the cold breeze stream of air, and/or the cold blast stream of air as the atmospherically enhanced high-velocity collective output streams of air 850.1 through 850.*l* by relying on the wind-chill effect caused by the idle stream of air, the breeze stream of air, and/or the blast stream of air in a substantially similar manner as described above in FIG. 7A and FIG. 7B. In the exemplary embodiment illustrated in FIG. 8, the portable mobile effects pods 804.1 through 804.*l* can include one or more liquid scent storage tanks 810 situated within the mechanical enclosure 812 for storing one or more scented fluids. In this exemplary embodiment, the portable mobile effects pods 804.1 through 804.*l* can select one or more of the one or more scented fluids within the one or more liquid scent storage tanks 810 and provide the one or more selected scented fluids as the one or more scented fluids 760 as described above in FIG. 7A and FIG. 7B to provide an example. The portable mobile effects pods 804.1 through 804.*l* can utilize the one or more scented fluids from the one or more liquid scent storage tanks 810 to provide the scented stream of air as the atmospherically enhanced high-velocity collective output streams of air 850.1 through 850.*l* in a substantially similar manner as described above in FIG. 7A and FIG. 7B.

Exemplary Application for the Exemplary Atmospheric Effects System Systems

Figure 9:
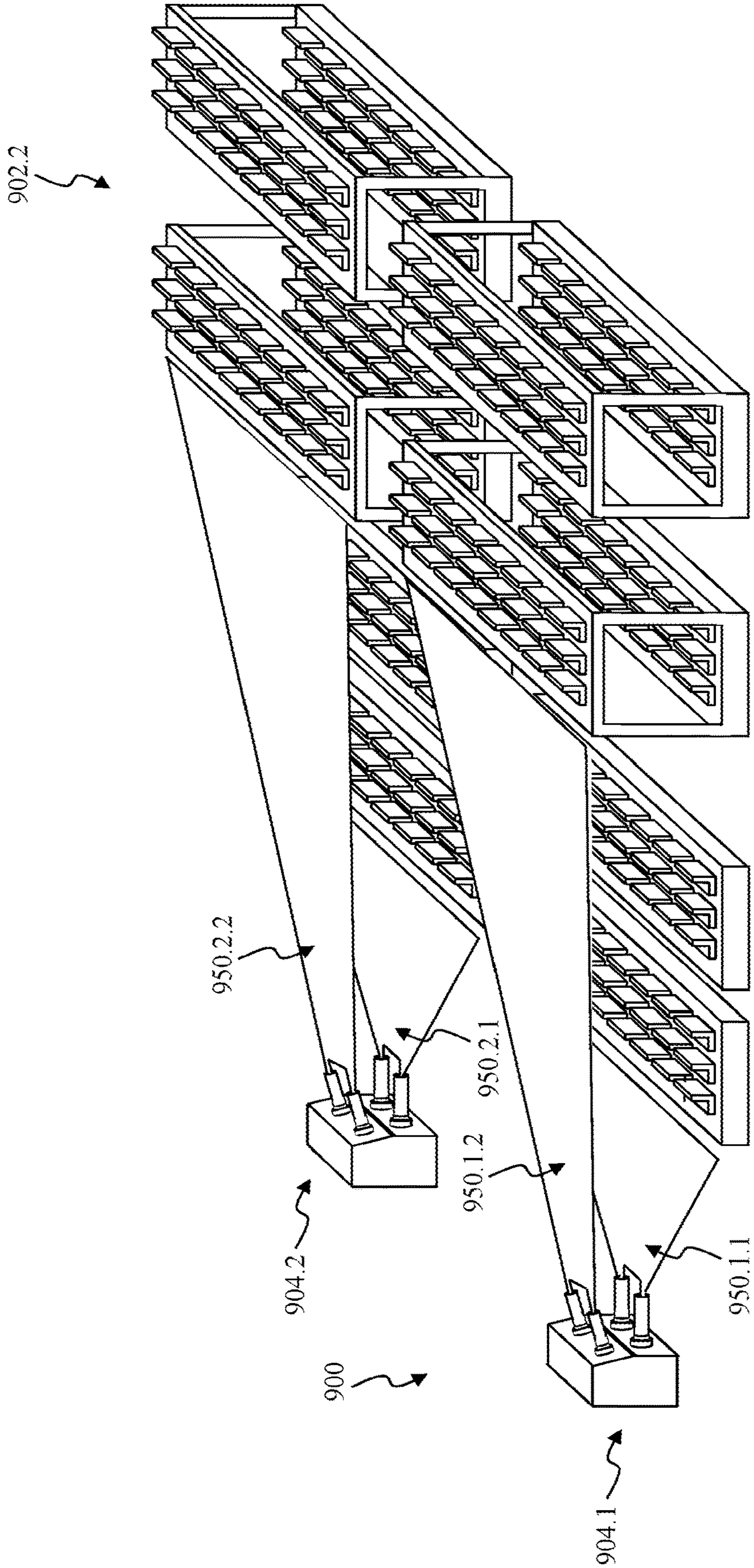
FIG. 9 illustrates another pictorial representation of the exemplary venue in accordance with some exemplary embodiments.

FIG. 9 illustrates another pictorial representation of the exemplary venue in accordance with some exemplary embodiments. In the exemplary embodiment illustrated in FIG. 9, an atmospheric effects system 900 can provide various atmospheric effects relating to an event, such a musical event, a theatrical event, a sporting event, a motion picture, and/or any other suitable event that will be apparent to those skilled in the relevant art(s) without departing the spirit and scope of the present disclosure. In some embodiments, these atmospheric effects can include the idle stream of air, the breeze stream of air, the blast stream of air, the cold stream of air, the cold breeze stream of air, the cold blast stream of air, the warm stream of air, the warm breeze stream of air, the warm blast stream of air, the scented stream of air, and/or any combination thereof as described above. In some embodiments, the atmospheric effects system 900 can be situated within a venue, such as the venue 600 as described above in FIG. 6A, which hosts the event. In these embodiments, the atmospheric effects system 900 can present the atmospheric effects to an audience within the venue to enhance the immersion of the audience as they are viewing the event.

As illustrated in FIG. 9 the atmospheric effects system 900 can be situated within the venue to provide the atmospheric effects to the audience seated in seating section 902.1 and the section 902.2 to enhance the immersion of the audience seated in the seating section 902.1 and the section 902.2 in viewing the event. In some embodiments, the atmospheric effects system 900 can represent an exemplary embodiment of the atmospheric effects system 700 as described above in FIG. 7A and/or the atmospheric effects system 800 as described above in FIG. 8. In some embodiments, the seating section 902.1 and the section 902.2 can represent two seating sections from among the seating sections 602.1 through 602.*d* and/or portions thereof as described above in FIG. 6A.

In the exemplary embodiment illustrated in FIG. 9, the atmospheric effects system 900 includes a portable mobile effects pod 904.1 and a portable mobile effects pod 904.2. The portable mobile effects pod 904.1 and the portable mobile effects pod 904.2 can represent exemplary embodiments of the portable mobile effects pod 726 as described above in FIG. 7A and/or the portable mobile effects pods 804.1 through 804.*l* as described above in FIG. 8. As illustrated in FIG. 9, the portable mobile effects pod 904.1 and the portable mobile effects pod 904.2 can provide high-velocity collective output streams of air 950.1.1 through 950.2.2, respectively, in a substantially similar manner as described above in FIG. 1, FIG. 2A through FIG. 2D, FIG. 3A through FIG. 3C, FIG. 4, FIG. 5A, and/or FIG. 5B. In some embodiments, the portable mobile effects pod 904.1 and the portable mobile effects pod 904.2 can be situated within different locations within the venue. As illustrated in FIG. 9, the portable mobile effects pod 904.1 can be situated within a first location within the venue to focus the high-velocity, high-volume collective output stream of air 950.1.1 toward the seating section 902.1 and the high-velocity, high-volume collective output stream of air 950.1.2 toward the seating section 902.2 to provide the atmospheric effects to the audience seated in the seating section 902.1 and the seating section 902.1, respectively. Similarly, the portable mobile effects pod 904.1 can be situated within a second location within the venue to focus the high-velocity, high-volume collective output stream of air 950.2.1 toward the seating section 902.1 and the high-velocity, high-volume collective output stream of air 950.2.2 toward the seating section 902.2 to provide the atmospheric effects to the audience seated in the seating section 902.1 and the seating section 902.1, respectively. The high-velocity collective output streams of air 950.1.1 through 950.2.2 thereafter propagate through rows of seats within the seating section 902.1 and the seating section 902.2 in a substantially similar manner as described above in FIG. 6D.

CONCLUSION

The Detailed Description referred to accompanying figures to illustrate exemplary embodiments consistent with the disclosure. References in the disclosure to "an exemplary embodiment" or "exemplary embodiments" indicates that the exemplary embodiment(s) described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A system to present an atmospheric effect to an audience within a venue, the system comprising:

- a first mobile effects pod configured to:
  - receive a first plurality of input streams of air;
  - adjust one or more characteristics, parameters, or attributes of a first input stream of air from among the first plurality of input streams of air to introduce the atmospheric effect into a first collective output stream of air; and
  - amplify a second input stream of air from among the first plurality of input streams of air utilizing the adjusted first input stream of air to provide a first plurality of output streams of air that collectively combine to provide the first collective output stream of air to a first seating section in the venue;
- a second mobile effects pod configured to:
  - receive a second plurality of input streams of air;
  - adjust one or more characteristics, parameters, or attributes of a third input stream of air from among the second plurality of input streams of air to introduce the atmospheric effect into a second collective output stream of air; and amplify a fourth input stream of air from among the second plurality of input streams of air utilizing the adjusted third input stream of air to provide a second plurality of output streams of air that collectively combine to provide the second collective output stream of air to a second seating section in the venue; and an atmospheric effects computer system, communicatively coupled to the first mobile effects pod and the second mobile effects pod, configured to control the one or more characteristics, parameters, or attributes of the first input stream of air and the one or more characteristics, parameters, or attributes of the third input stream of air.

2. The system of claim 1, wherein the atmospheric effects computer system is configured to send one or more control signals to the first mobile effects pod and the second mobile effects pod, wherein the one or more control signals comprise event information that describes the one or more characteristics, parameters, or attributes of the first input stream of air and the one or more characteristics, parameters, or attributes of the third input stream of air.

3. The system of claim 1, wherein the atmospheric effect is related to velocities of the first collective output stream of air and the second collective output stream of air, temperatures of the first collective output stream of air and the second collective output stream of air, or scents of the first collective output stream of air and the second collective output stream of air.

4. The system of claim 3, wherein the atmospheric effects computer system is configured to adjust temperatures of the first input stream of air and the third input stream of air to adjust the temperatures of the first collective output stream of air and the second collective output stream of air, respectively.

5. The system of claim 3, wherein the atmospheric effects computer system is configured to adjust velocities of the first input stream of air and the third input stream of air to adjust the velocities of the first collective output stream of air and the second collective output stream of air, respectively.

6. The system of claim 3, wherein the atmospheric effects computer system is configured to introduce scents into the second plurality of output streams of air and the fourth plurality of output streams of air to adjust the scents of the first collective output stream of air and the second collective output stream of air, respectively.

7. The system of claim 1, wherein the venue comprises a music theatre, a music club, a concert hall, an area, a convention center, or a stadium.

8. The system of claim 1, wherein the first mobile effects pod is configured to utilize energy from the adjusted first input stream of air to accelerate the second input stream of air to provide the first plurality of output streams of air, and wherein the second mobile effects pod is configured to utilize energy from the adjusted third input stream of air to accelerate the fourth input stream of air to provide the second plurality of output streams of air.

9. A method of presenting an atmospheric effect to an audience within a venue, the method comprising:

receiving, by a mobile effects pod from an atmospheric effects computer system, a control signal that is related to one or more characteristics, parameters, or attributes of the atmospheric effect;

adjusting, by the mobile effects pod, one or more characteristics, parameters, or attributes of a first input stream of air in accordance with the one or more characteristics, parameters, or attributes of the atmospheric effect to introduce the atmospheric effect into a collective output stream of air; and amplifying, by the mobile effects pod, a second input stream of air utilizing the adjusted first input stream of air to provide a plurality of output streams of air that collectively combine to provide the collective output stream of air to a seating section in the venue.

10. The method of claim 9, wherein the atmospheric effect is related to a velocity of the collective output stream of air, a temperature of the collective output stream of air, or a scent of the collective output stream of air.

11. The method of claim 10, wherein the adjusting comprises adjusting a temperature of the first input stream of air to adjust the temperature of the collective output stream of air.

12. The method of claim 10, wherein the adjusting comprises adjusting a velocity of the first input stream of air to adjust the velocity of the collective output stream of air.

13. The method of claim 10, wherein the adjusting comprises introducing a scent into the plurality of output streams of air to adjust the scent of the collective output stream of air.

14. The method of claim 9, wherein the amplifying comprises utilizing energy from the adjusted first input stream of air to accelerate the second input stream of air to provide the plurality of output streams of air.

15. A venue for hosting an event, the venue comprising:

a plurality of seating sections within the venue to seat an audience within the venue to view the event;

a plurality of mobile effects pods to generate an atmospheric effect relating to the event, the plurality of mobile effects pods being configured to:

receive a first plurality of input streams of air;

adjust one or more characteristics, parameters, or attributes of the first plurality of input streams of air to introduce the atmospheric effect into a plurality of collective output streams of air; and amplify a second plurality of input streams of air utilizing the adjusted first plurality of input streams of air to provide a plurality of output streams of air that collectively combine to provide the plurality of collective output streams of air to the plurality of seating sections; and an atmospheric effects computer system, communicatively coupled to the plurality of mobile effects pods, configured to control the one or more characteristics, parameters, or attributes of the first plurality of input streams of air.

16. The venue of claim 15, wherein the atmospheric effects computer system is configured to send one or more control signals to the plurality of mobile effects pods, wherein the one or more control signals comprise event information that describes the one or more characteristics, parameters, or attributes of the first plurality of input streams of air.

17. The venue of claim 16, wherein the atmospheric effect is related to a velocity of the plurality of collective output streams of air, a temperature of the plurality of collective output streams of air, or a scent of the plurality of collective output streams of air.

18. The venue of claim 15, wherein the plurality of mobile effects pods is configured to: adjust temperatures of the first plurality of input streams of air to adjust a temperature of the plurality of collective output streams of air.

19. The venue of claim 15, wherein the plurality of mobile effects pods is configured to adjust velocities of the first plurality of input streams of air to adjust a velocity of the plurality of collective output streams of air.

20. The venue of claim 15, wherein the plurality of mobile effects pods is configured to introduce scents into the plurality of output streams of air to adjust a scent of the plurality of collective output streams of air.

21. The venue of claim 15, wherein the plurality of mobile effects pods is configured to utilize energy from the adjusted first plurality of input streams of air to accelerate the adjusted second plurality of input streams of air to provide the plurality of output streams of air.

* * * * *